(12) United States Patent
Ozasa et al.

(10) Patent No.: US 10,891,834 B2
(45) Date of Patent: Jan. 12, 2021

(54) AUTOMATIC TRANSACTION APPARATUS AND CONTROL METHOD THEREOF

(71) Applicant: Hitachi-Omron Terminal Solutions, Corp., Tokyo (JP)

(72) Inventors: Junichi Ozasa, Tokyo (JP); Hisao Ogata, Tokyo (JP); Hiroyuki Suzuki, Tokyo (JP); Atsushi Kato, Tokyo (JP)

(73) Assignee: HITACHI-OMRON TERMINAL SOLUTIONS, CORP., Tokyo (JP)

( * ) Notice: Subject to any disclaimer, the term of this patent is extended or adjusted under 35 U.S.C. 154(b) by 73 days.

(21) Appl. No.: 16/314,517

(22) PCT Filed: Jun. 19, 2017

(86) PCT No.: PCT/JP2017/022598
§ 371 (c)(1),
(2) Date: Dec. 31, 2018

(87) PCT Pub. No.: WO2018/100777
PCT Pub. Date: Jun. 7, 2018

(65) Prior Publication Data
US 2019/0164388 A1    May 30, 2019

(30) Foreign Application Priority Data
Nov. 30, 2016  (JP) ................... 2016-233366

(51) Int. Cl.
*G07F 19/00* (2006.01)
*H04L 29/06* (2006.01)
*G07D 9/00* (2006.01)

(52) U.S. Cl.
CPC ............ *G07F 19/203* (2013.01); *G07D 9/00* (2013.01); *G07F 19/207* (2013.01); *G07F 19/21* (2013.01);
(Continued)

(58) Field of Classification Search
USPC ........................................... 235/379
See application file for complete search history.

(56) References Cited

U.S. PATENT DOCUMENTS

| 8,635,159 B1* | 1/2014 | Cobb ............ G07F 7/1025 235/379 |
| 2012/0131680 A1 | 5/2012 | Baba |
| 2016/0314381 A1 | 10/2016 | Miyazawa |

FOREIGN PATENT DOCUMENTS

| JP | H07-014050 A | 1/1995 |
| JP | 2004-362012 A | 12/2004 |

(Continued)

OTHER PUBLICATIONS

International Search Report and Written Opinion received in PCT/JP2017/022598 dated Sep. 19, 2017.

*Primary Examiner* — Rafferty D Kelly
(74) *Attorney, Agent, or Firm* — Foley & Lardner LLP

(57) ABSTRACT

A highly reliable automatic transaction apparatus and control method thereof which are capable of suppressing unauthorized transactions and the like are proposed. A plurality of modules which each execute processing required for the payout transaction, an overall control unit which controls each of the modules, and a security control unit are provided in an automatic transaction apparatus; the security control unit holds in advance a first list in which content of signals which are exchanged between the overall control unit and each of the modules at the time of a normal payout transaction is recorded in the order in which the signals are exchanged, sequentially records the content of the signals which are exchanged between the overall control unit and each of the modules at the time of the actual payout transaction in a second list in the order in which the signals are exchanged, and issues a signature approving operation of the modules when there is a match between the content of (Continued)

the first list and the content of the second list, and the modules execute a corresponding operation when the security control unit has issued the signature.

10 Claims, 28 Drawing Sheets

(52) U.S. Cl.
CPC ........ *G07F 19/211* (2013.01); *H04L 63/0838* (2013.01)

(56) References Cited

FOREIGN PATENT DOCUMENTS

| | | |
|---|---|---|
| JP | 2006-330864 A | 12/2006 |
| JP | 2007-199881 A | 8/2007 |
| JP | 2011-018247 A | 1/2011 |
| JP | 4719445 B2 | 4/2011 |
| WO | WO-2015-087866 A1 | 6/2015 |

\* cited by examiner

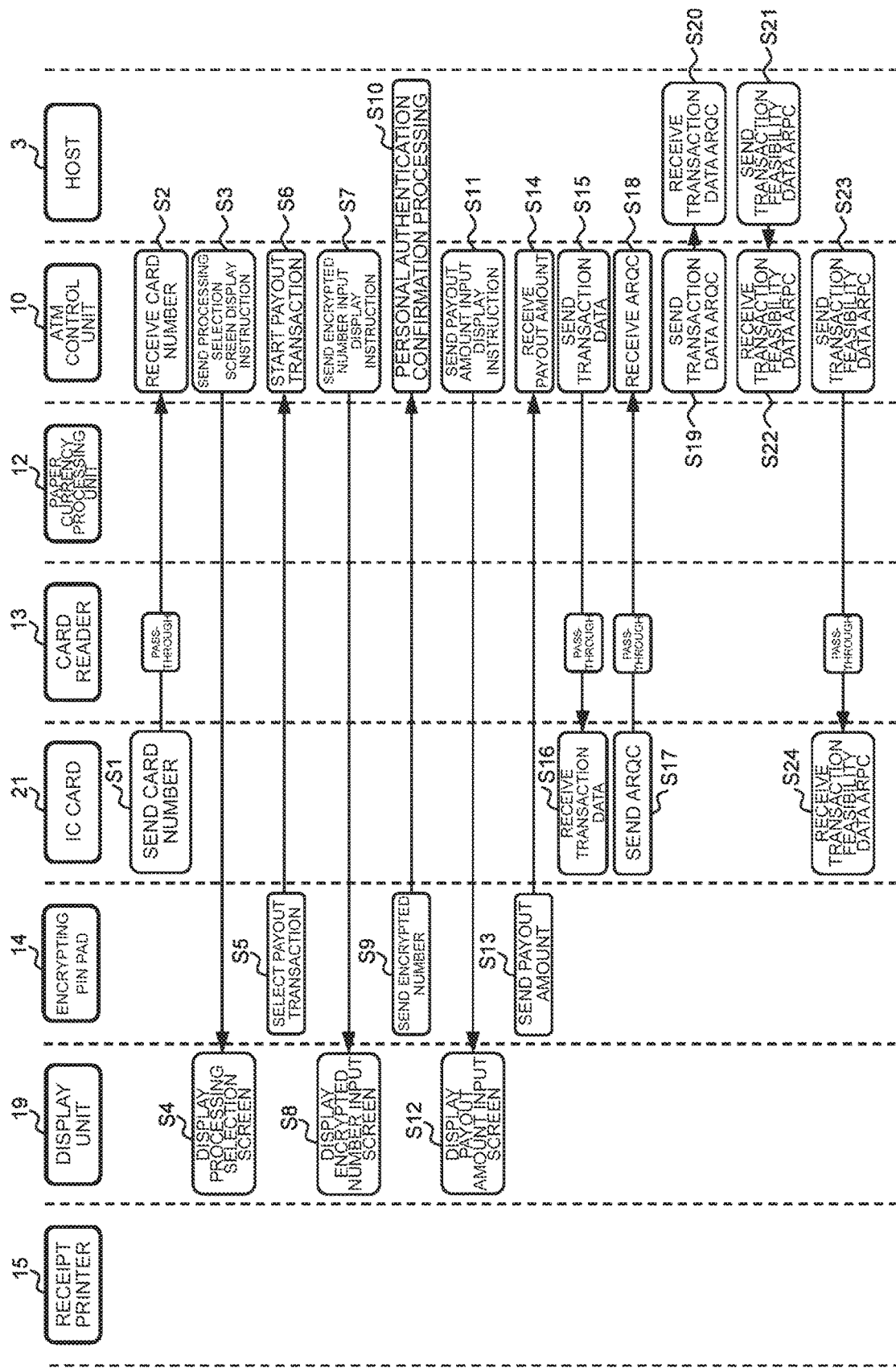

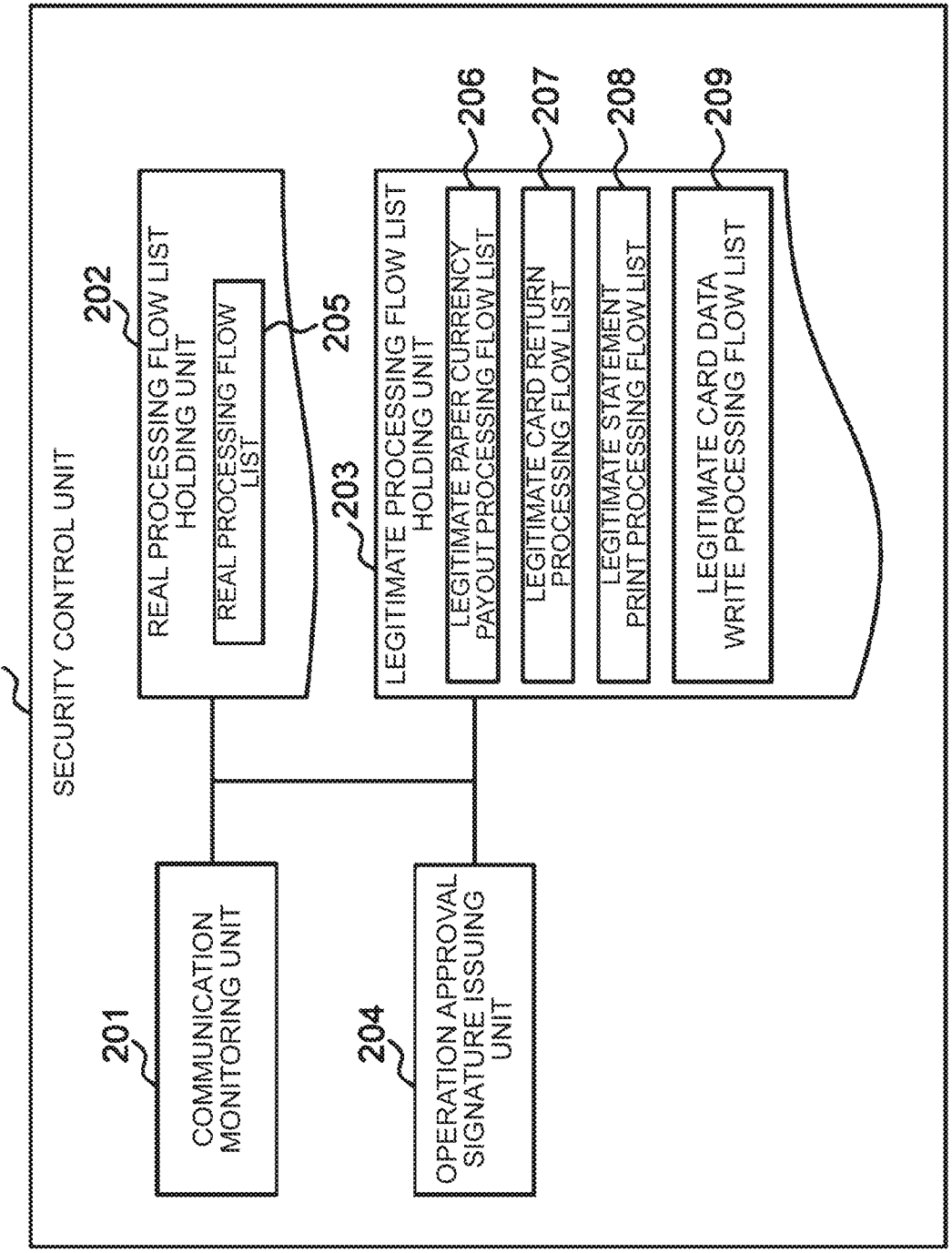

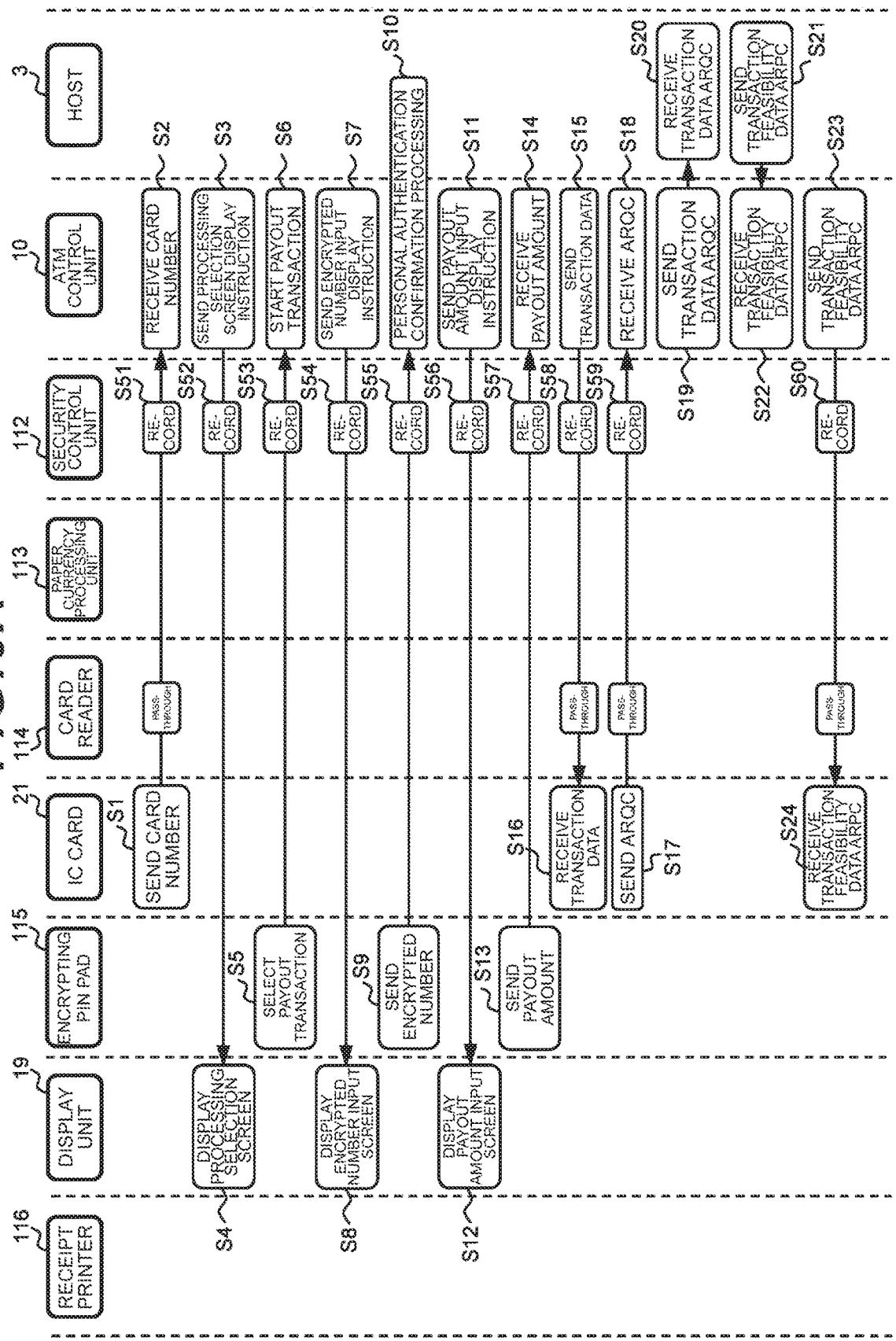

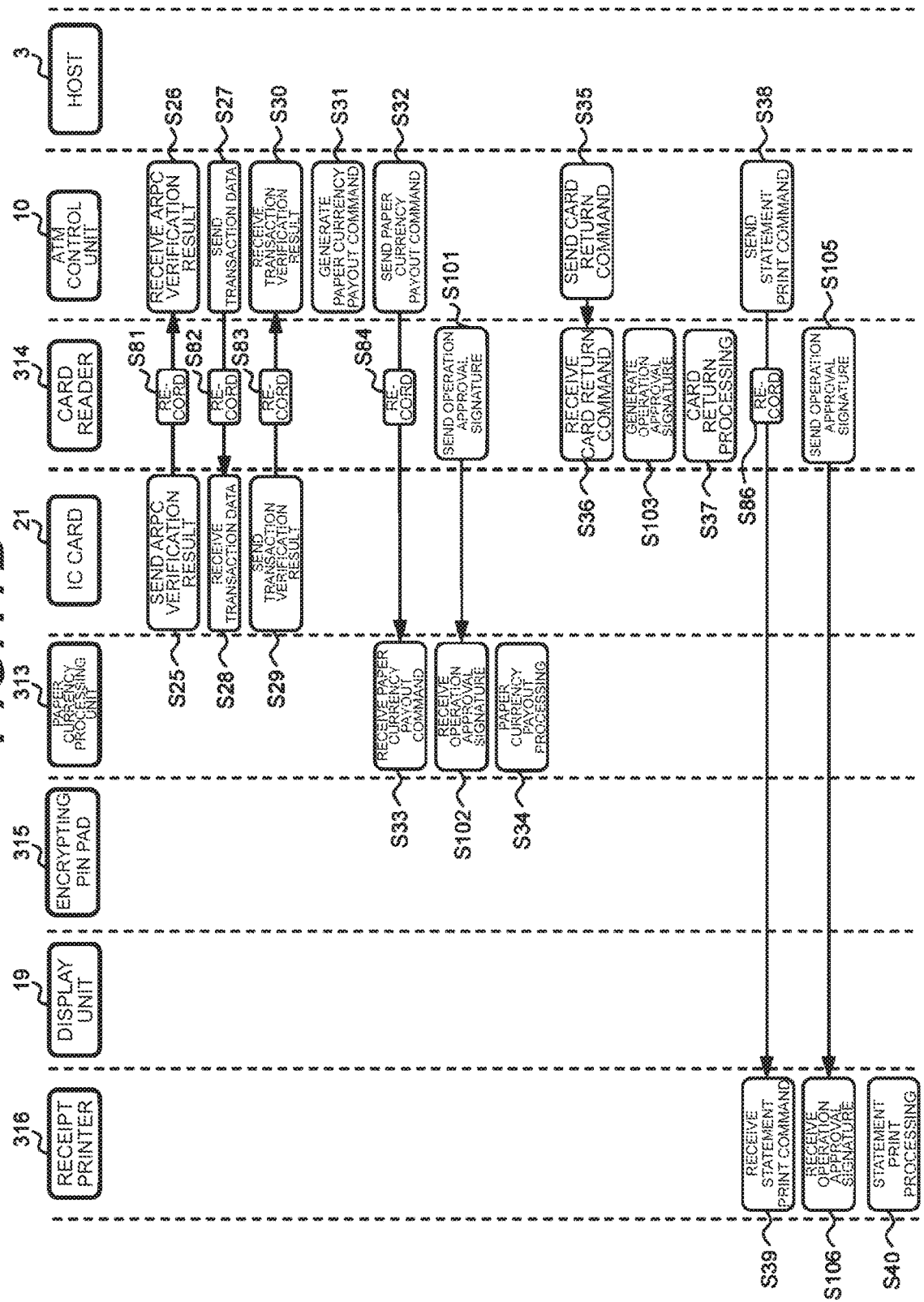

FIG. 15

| MODE (COMMAND EXECUTION AUTHORIZATION) | | | COMMAND |
|---|---|---|---|
| NORMAL | PRIVILEGE 1 | PRIVILEGE 2 | |
| EXECUTABLE | EXECUTABLE | EXECUTABLE | CARD INSERT COMMAND |
| EXECUTABLE | EXECUTABLE | EXECUTABLE | CARD EJECT COMMAND |
| EXECUTABLE | EXECUTABLE | EXECUTABLE | DATA READ COMMAND |
| NOT EXECUTABLE | EXECUTABLE | EXECUTABLE | DATA WRITE COMMAND |
| EXECUTABLE | EXECUTABLE | EXECUTABLE | CARD LOCK COMMAND |
| NOT EXECUTABLE | NOT EXECUTABLE | EXECUTABLE | CARD LOCK CANCELATION COMMAND |
| EXECUTABLE | EXECUTABLE | EXECUTABLE | PRIVILEGE 1 AUTHENTICATION COMMAND |
| NOT EXECUTABLE | EXECUTABLE | EXECUTABLE | PRIVILEGE 2 AUTHENTICATION COMMAND |

| NUMBER | CARD NUMBER | PAYMENT AUTHORIZATION AMOUNT | CURRENT PAID AMOUNT |
|---|---|---|---|
| 1 | 1234-1234-1234-1234 | 1,000,000 YEN | 990,000 YEN |
| 2 | 4321-4321-4321-4321 | 1,000,000 YEN | 550,000 YEN |
| 3 | 1111-2222-3333-4444 | 1,000,000 YEN | 880,000 YEN |
| 4 | 4444-3333-2222-1111 | 1,000,000 YEN | 1,000,000 YEN |
| ... | ... | ... | ... |

650

AUTOMATIC TRANSACTION APPARATUS AND CONTROL METHOD THEREOF

TECHNICAL FIELD

The present invention relates to an automatic transaction apparatus and control method thereof and is preferably applied to an ATM (Automated Teller Machine) which performs payout transactions based on information recorded on a credit card or cash card or the like and based on user operations, for example.

BACKGROUND ART

Conventionally, cases where criminals seeking illegal profits perform physical or logic-based tricks on automatic transaction apparatuses such as ATMs to profit illegally have become a concern.

For example, in an automatic transaction apparatus such as an ATM, unauthorized processing of an unsubstantiated transaction is sometimes executed by sending an unauthorized command to an internal module. As an example, cash is sometimes withdrawn by sending an unauthorized payout command that is unrelated to a transaction to a paper currency processing unit which performs paper currency deposits and payouts in an automatic transaction apparatus.

Furthermore, for example, illegal acts whereby criminals tamper with a card reader which is installed in an automatic transaction apparatus to produce a card jam are committed. In the foregoing case, when the user inserts a card into the card reader that has been tampered with, the card jams in the card reader and the card can then no longer be returned even when the user performs a card return operation on the automatic transaction apparatus. Then, after the user has given up trying to have their card returned and has left, the criminal obtains the card illegally by means of tweezers or pliers or other physical means.

Moreover, conventionally, even when there is no card reader in an automatic transaction apparatus which has a reinforced security function to counter unauthorized payouts using counterfeit cards, a determination of payout feasibility at the time of a cash transaction has been made by a high-level host, for example. Therefore, the high-level host is unable to share transaction information on credit transactions, which have been executed in situations where the high-level host was unable to perform communications and so forth, with other automatic transaction apparatuses, and even when an unauthorized payout is generated by using a forged card at a certain automatic transaction apparatus, the high-level host is unable to suppress payouts at automatic transaction apparatuses in the vicinity.

As means for resolving this kind of problem, technology has conventionally been proposed whereby, upon detecting an abnormality such as an unauthorized operation by a criminal in the control unit of the automatic transaction apparatus, the processing status in the control unit is changed and the processing is interrupted. For example, PTL 1 has disclosed technology whereby it is determined whether a transaction is abnormal by comparing the transaction content of a user of the automatic transaction apparatus at the time of a transaction with the transaction history of the automatic transaction apparatus which is held by the automatic transaction apparatus, and the transaction processing is suspended when it is determined that the transaction is abnormal.

Furthermore, PTL 2 has proposed a method of providing a card lock mechanism in a card reader, for example. When the card reader detects any abnormality while handling the card, the card is locked inside the card reader by causing the card lock mechanism to operate. As a result, the criminal will find it difficult to remove the card by means of tweezers or pliers or other physical means.

Furthermore, a technology exists whereby payout limit amount information is prepared and configured between a high-level host and a normal ATM control unit which is provided in the ATM and tasked with controlling the overall operation of the ATM. For example, PTL 3 has disclosed a technology whereby payout limit amount information is prepared and configured between an ATM control unit and a host and this payout limit amount is compared with the current payout amount, and when the current payout amount exceeds the payout limit amount according to the configured payout limit amount information, the processing of the transaction is suspended.

CITATION LIST

Patent Literature

[PTL 1] Japanese Laid-Open Patent Application Publication No. 2007-199881
[PTL 2] International Publication No. 2015/087866
[PTL 3] Japanese Patent Publication No. 4719445.

SUMMARY OF THE INVENTION

Problems to be Solved by the Invention

However, according to the technology disclosed in PTL 1, when the application software and control software of the overall control unit which control the paper currency processing unit, card reader and receipt printer and the like in the automatic transaction apparatus and which are provided in the automatic transaction apparatus have been hijacked by malware, even when a criminal performs a transaction with abnormal content, the overall control unit is not operating normally and is therefore unable to detect the abnormality or the overall control unit disregards the detection of the abnormality even when an abnormality is detected, and there has thus been a risk of a payout command being sent to the paper currency processing unit.

Moreover, by hijacking the application software and control software of the overall control unit by means of malware, a criminal is able to illegally exploit the card numbers of cards that have performed transactions thus far and been kept in the overall control unit by downloading same to an IC card by taking advantage of an operation in which a card reader is made to read the IC card to which special data has been written. Moreover, the criminal is able to illegally cause a statement printer to print card information of cards that have performed transactions thus far and been kept in the automatic processing apparatus by taking advantage of an operation in which a card reader is made to read a card to which special magnetic data has been written. In other words, because the overall control unit itself has been hijacked by malware, there has been a problem with the technology disclosed in PTL 1 in that it is not possible to detect an illegal act performed by means of a criminal operation that differs from the norm or to perform processing to interrupt an unauthorized transaction.

Furthermore, even when an attempt is made to lock the card by means of the card lock mechanism disclosed in PTL 2 and prevent the card from being obtained illegally, as described hereinabove, the criminal is able to cancel the card lock by infecting the overall control unit with malware and performing an operation that differs from the norm using an encrypting pin pad, for example, to send a card lock cancellation command to the card reader.

Moreover, when the technology disclosed in PTL 3 is used, when there is no response from another host due to a malicious communication attack in a cash transaction conducted using another company's card, a plurality of automatic transaction apparatuses are granted approval to perform unauthorized payouts using the same card as credit transactions for an unauthorized payout that is performed using a counterfeit card. Moreover, there is a problem in that processing to suspend an unauthorized transaction is not possible because consideration has not previously been given to an initial card reader, reinforced with security function, transmitting initial payout information to a security function-reinforced card reader of another automatic transaction apparatus, independently of a host.

The present invention was devised in view of the foregoing points and an object of this invention is to propose a highly reliable automatic transaction apparatus and control method thereof which are capable of suppressing unauthorized transactions and the like.

Means to Solve the Problems

In order to solve this problem, the present invention is an automatic transaction apparatus which performs a payout transaction according to a request from a user, comprising a plurality of modules which each execute processing required for the payout transaction, an overall control unit which controls each of the modules, and a security control unit, wherein the security control unit holds in advance a first list in which content of signals which are exchanged between the overall control unit and each of the modules at the time of a normal payout transaction is recorded in the order in which the signals are exchanged and sequentially records the content of the signals which are exchanged between the overall control unit and each of the modules at the time of the actual payout transaction in a second list in the order in which the signals are exchanged, and issues a signature approving operation of the modules when there is a match between the content of the first list and the content of the second list, and wherein the modules execute a corresponding operation when the security control unit has issued the signature.

Furthermore, the present invention is a control method of an automatic transaction apparatus which performs a payout transaction according to a request from a user, the automatic transaction apparatus having a plurality of modules which each execute processing required for the payout transaction, an overall control unit which controls each of the modules, and a security control unit, the control method comprising a first step in which the security control unit holds in advance a first list in which content of signals which are exchanged between the overall control unit and each of the modules at the time of a normal payout transaction is recorded in the order in which the signals are exchanged, a second step in which the security control unit sequentially records the content of the signals which are exchanged between the overall control unit and each of the modules at the time of the actual payout transaction in a second list in the order in which the signals are exchanged, a third step in which the security control unit issues a signature approving operation of the modules when there is a match between the content of the first list and the content of the second list, and a fourth step in which the modules execute a corresponding operation when the security control unit has issued the signature.

According to the automatic transaction apparatus and control method thereof of the present invention, it is possible to prevent unauthorized payouts from being performed, a card of a user from being illegally exploited by a criminal, information on the card of the user from being illegally exploited by the criminal, and a large quantity of card information from being illegally exploited by the criminal.

Advantageous Effects of the Invention

According to the present invention, it is possible to realize a highly reliable automatic transaction apparatus which is capable of suppressing unauthorized transactions and the like.

BRIEF DESCRIPTION OF DRAWINGS

FIG. 5A is a sequence diagram showing the flow of payout transaction processing in a conventional automatic transaction system.

FIG. 7 is a block diagram showing a configuration of a security control unit.

FIG. 8A is a sequence diagram showing the flow of payout transaction processing in an automatic transaction system according to the first embodiment.

FIG. 11B is a sequence diagram showing the flow of payout transaction processing in an automatic transaction system according to the second embodiment.

FIG. 15 is a conceptual drawing showing a configuration example of a command authorization association list.

FIG. 24 is a conceptual drawing showing a configuration example of a card information database.

DESCRIPTION OF EMBODIMENTS

An embodiment of the present invention will now be explained in detail with reference to the appended drawings.

(1) First Embodiment

(1-1) Configuration of Conventional Automatic Transaction System

Foremost, the configuration of a conventional automatic transaction system will be explained when explaining the automatic transaction system according to a first embodiment.

Figure 1:
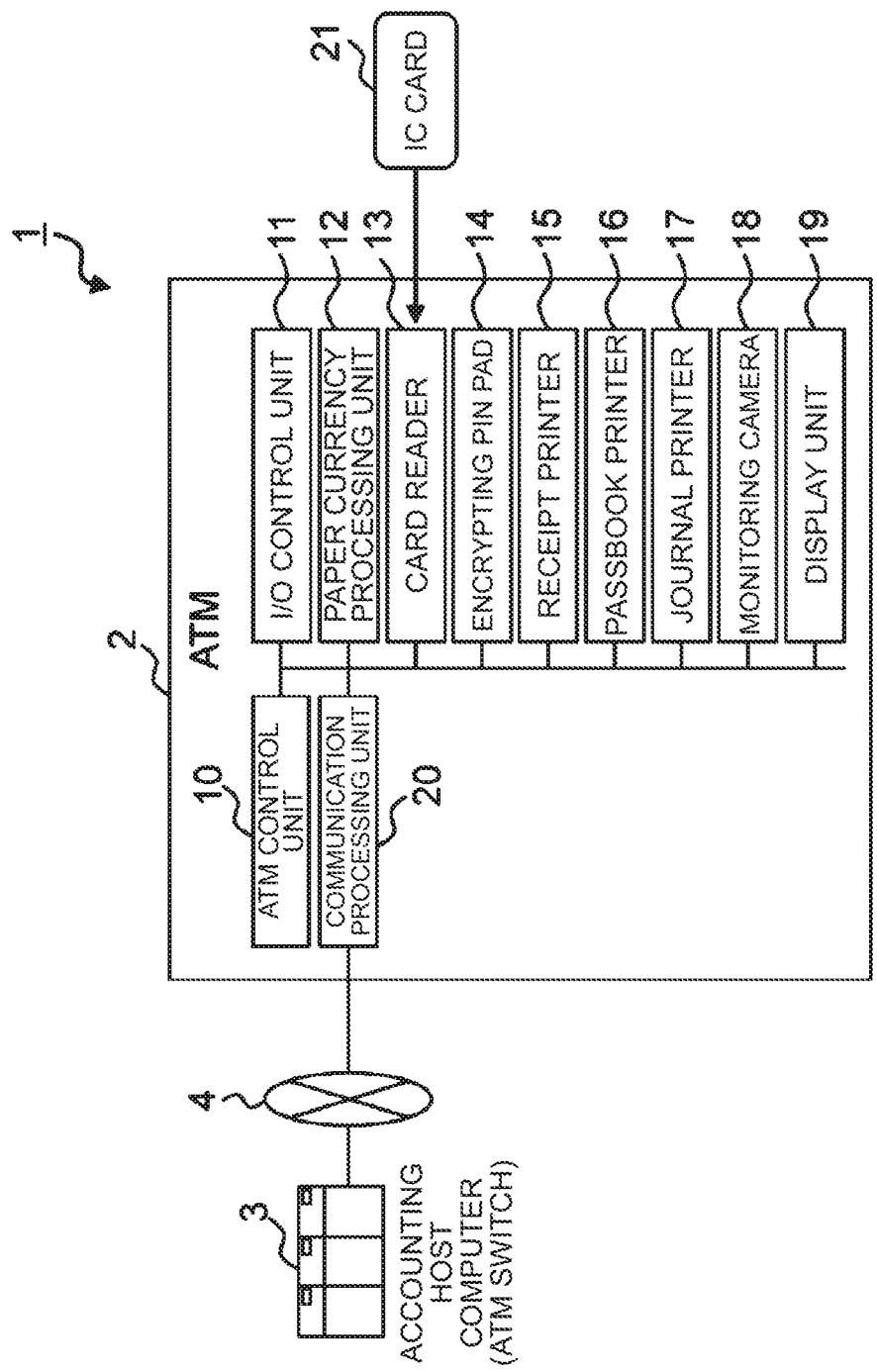
FIG. 1 is a block diagram showing an overall configuration example of a conventional automatic transaction system.

FIG. 1 shows a configuration example of a conventional automatic transaction system. An automatic transaction system 1 is configured by coupling one or more ATMs 2 and an accounting host computer 3 via a wide-area network 4 such as a LAN (Local Area Network) or WAN (Wide Area Network).

The ATM 2 is an automatic transaction apparatus which performs transactions such as cash deposits and payouts according to operations of users. The ATM 2 is configured by comprising an ATM control unit 10 which is tasked which controlling the overall operation of the ATM 2, an I/O control unit 11 which controls the display lamp of the front panel of the ATM 2 and detects the opening and closing of the front panel, a paper currency processing unit 12 which counts the paper currency inserted into the dispensing port provided in the front of the ATM 2 and transfers the paper currency to a receiving chamber, and withdraws paper currency to be deposited or paid out from the receiving chamber and transfers same to the dispensing port, a card reader 13 which reads information recorded on a card medium 21 such as a cash card that is required for transactions at the ATM 2 from the card medium 21, an encrypting pin pad 14 which comprises a ten key for inputting a PIN or the like and a function for encrypting information such as the PIN that is input, a receipt printer 15 which is a printer for transaction statements, a passbook printer 16 which is a printer for passbooks, a journal printer 17 which prints logs of ATM transactions, a security monitoring camera 18 which takes a head shot of a user, a display unit 19 which displays information relating to transactions such as deposits and payouts and accepts operations from the user, and a communication processing unit 20 which communicates with the accounting host computer 3.

Note that the ATM 2 may also comprise a coin processing unit (not shown) for handling coins that are deposited and coins that are dispensed. Moreover, an example in which an IC (Integrated Circuit) card is used as a card medium 21 is explained hereinbelow. Hence, in the ensuing explanation, the 'card medium 21' is referred to as the 'IC card 21.'

Figure 2:
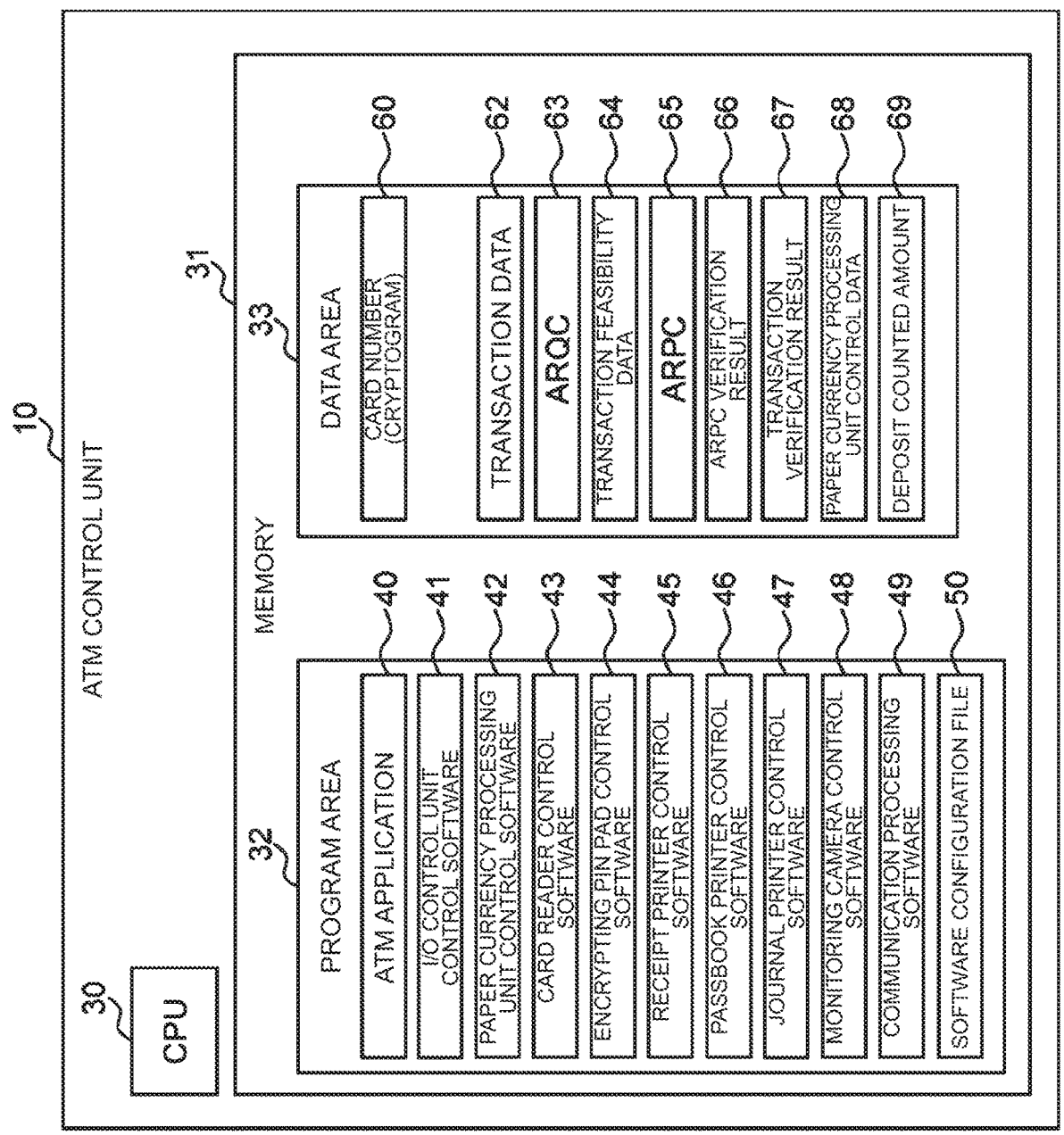
FIG. 2 is a block diagram showing a configuration example of a conventional automatic transaction system.

As shown in FIG. 2, the storage area of the memory 31 of the ATM control unit 10 is managed divided into a program area 32 and a data area 33. Furthermore, the program area 32 stores an ATM application software 40 which controls all transactions of the ATM 2, software for controlling each of an I/O (Input/Output) control unit 11, a paper currency processing unit 12, a card reader 13, an encrypting pin pad 14, a receipt printer 15, a passbook printer 16, a journal printer 17, a monitoring camera 18, and a display unit 19 (I/O control unit control software 41, paper currency processing unit control software 42, card reader control software 43, encrypting pin pad control software 44, receipt printer control software 45, passbook printer control software 46, journal printer control software 47, monitoring camera control software 48 and communication processing software 49), and a software configuration file 50 which is a configuration file for the software environment and the like.

The data area 33 also stores data that is required for deposit/payout transactions of the ATM 2. More specifically, a card number 60, transaction data 62, an ARQC (Authentication Request Cryptogram) 63, transaction feasibility data 64, an ARPC (Authentication Response Cryptogram) 65, an ARPC verification result 66, a transaction verification result 67, paper currency processing unit control data 68, and a deposit count amount 69 and the like are stored in the data area 33.

The card number 60 is information for specifying a user account such as a bank account number or credit card number and the like which is stored on the IC card 21, and is acquired from the IC card 21 by means of the card reader 13 and stored in the memory 31 of the ATM control unit 10.

The transaction data 62 is transaction telegram data which is sent to the accounting host computer 3. The transaction data 62 comprises transaction-related information based on inputs from a user such as payout amounts or deposit amounts, for example, and information relating to transaction amounts in particular. Furthermore, the transaction data 62 may include information such as the card number 60. The ARQC 63 is a message authentication code (MAC) for the transaction data 62 that is sent to the accounting host computer 3 and is generated by the IC card 21.

The transaction feasibility data 64 is data resulting from the accounting host computer 3 determining whether a transaction has succeeded by referring to the bank account balance or credit information or the like of the transaction data 62 sent from the ATM 2. Furthermore, the ARPC 65 is generated by the accounting host computer 3 which is a message authentication code for the transaction feasibility data 64. The accounting host computer 3 is also sometimes called an 'ATM switch,' an 'ATM high level apparatus' or an 'external computer' which means a computer that is external to the ATM 2.

The ARPC verification result 66 is data which shows a result obtained by verifying the message authentication code of the ARPC 65 in the IC card 21. Furthermore, the transaction verification result 67 is a message authentication code for transaction data that is generated in the IC card 21 and 'TC' is stored when a transaction is accepted and 'AAC' is stored when a transaction is denied.

The paper currency processing unit control data 68 is command data for paper currency processing which is sent by the ATM control unit 10 to the paper currency processing unit 12 (FIG. 1) and includes, for example, a paper currency payout command which instructs a paper currency payout, a paper currency count command which instructs a deposit count, and a paper currency storage command which instructs deposit storage. A deposit count amount 69 is a total amount obtained by the paper currency processing unit 12 counting the paper currency inserted in the ATM 2 at the time of a deposit transaction.

Figure 3:
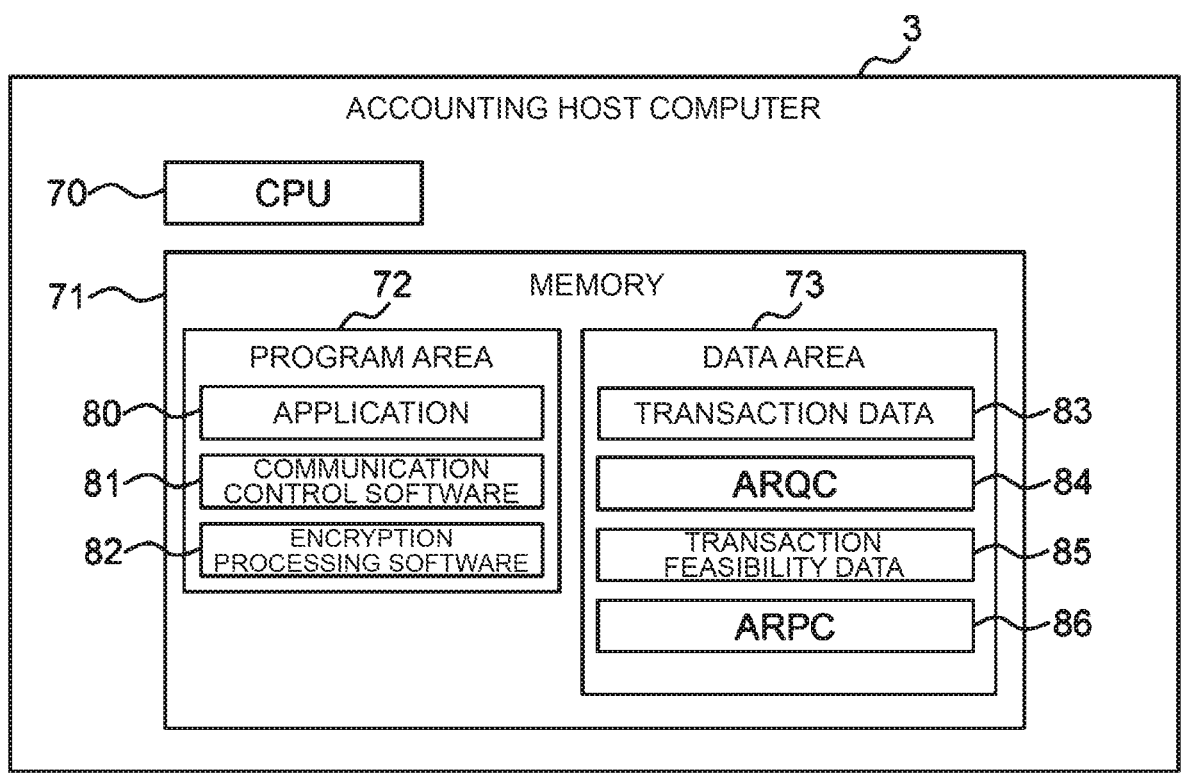
FIG. 3 is a block diagram showing a configuration example of an accounting host computer.

Meanwhile, the accounting host computer 3 is a computer apparatus which comprises a function for storing and managing information relating to the account and balance and so forth of the user of the ATM 2 and, as shown in FIG. 3, is configured by comprising information processing resources such as a CPU 70 which is tasked with controlling the overall operation of the accounting host computer 3, and a memory 71.

The storage area of the memory 71 of the accounting host computer 3 is managed divided into a program 72 and a data area 73 and the program area 72 stores an application 80, a communication control software 81 and an encryption processing software 82, and the data area 73 stores transaction data 83, ARQC 84, transaction feasibility data 85 and an ARPC 86.

The application 80 is software which provides overall control of the accounting host computer 3. Moreover, the communication control software 81 is software which has a function for controlling data communication between the accounting host computer 3 and each ATM 2. The encryption processing software 82 is software with an encryption processing function which verifies the ARQC 84 that is a message authentication code sent from the ATM 2 and generates a new message authentication code such as the ARPC 86.

Furthermore, the transaction data 83 is transaction telegram data for payout transactions and deposit transactions which is sent from the ATM 2 and is the same data as the transaction data 62 in FIG. 2. The ARQC 84 is a message authentication code for verifying whether the transaction data 83 has been falsified and is generated by the IC card 21. This ARQC 84 is the same data as the ARQC 63 in FIG. 2. The transaction feasibility data 85 is data indicating the result obtained from the accounting host computer 3 determining whether a transaction has succeeded by referring to the bank account balance or credit information or the like and is the same data as the transaction feasibility data 64 of FIG. 2. The ARPC 86 is generated by the accounting host computer 3 which is a message authentication code for the transaction feasibility data 85. This ARPC 86 is the same data as the ARPC 65 in FIG. 2.

Figure 4:
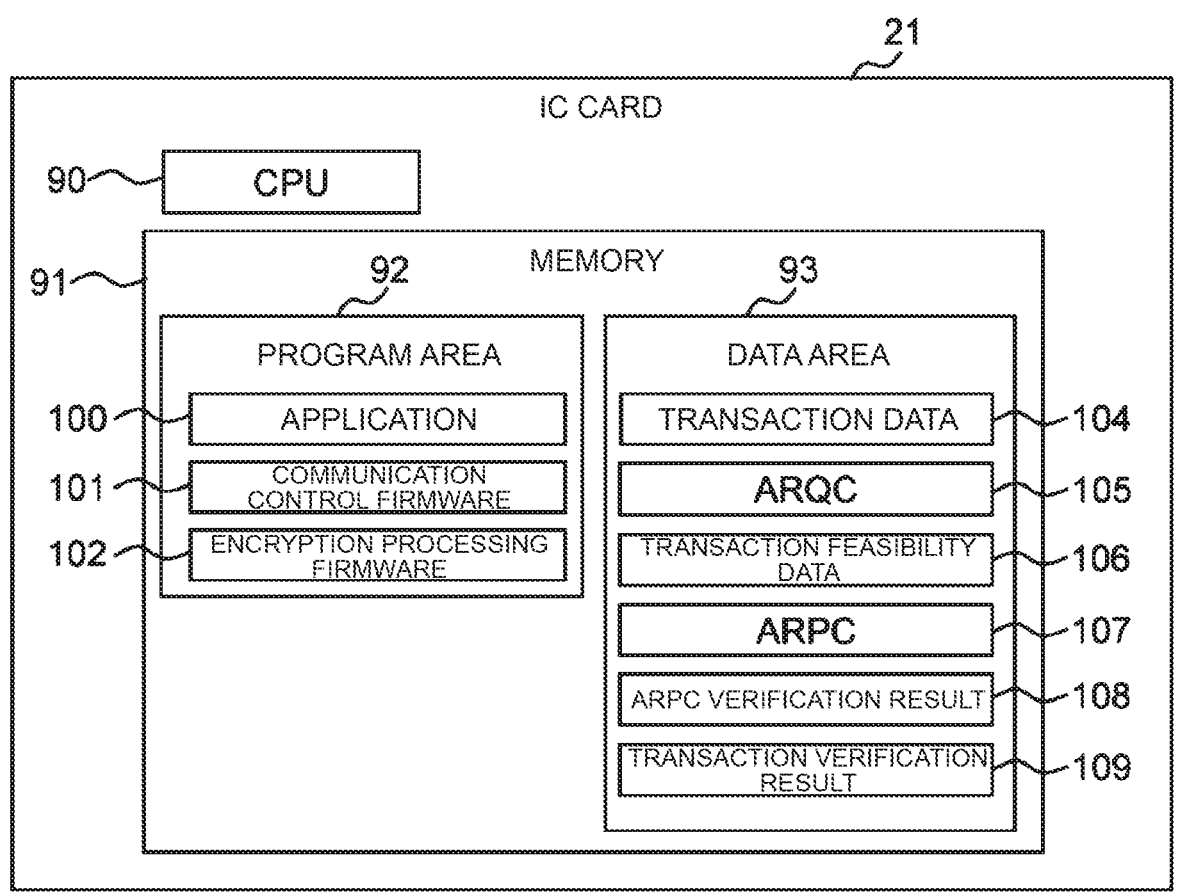
FIG. 4 is a block diagram showing a configuration example of an IC card.

FIG. 4 is a schematic configuration of the IC card 21. As can also be seen from FIG. 4, the IC card 21 is configured by comprising information processing resources such as a CPU 90 which is tasked with controlling the overall operation of the IC card 21, and a memory 91. Furthermore, the storage area of the memory 91 of the IC card 21 is managed divided into a program area 92 and a data area 93 and the program area 92 stores an application 100, a communication control firmware 101 and an encryption processing firmware 102, and the data area 93 stores transaction data 104, an ARQC 105, transaction feasibility data 106, an ARPC 107, an ARPC verification result 108, and a transaction verification result 109.

The application 100 is software which provides overall control of the IC card 21. Moreover, the communication control firmware 101 is software comprising a function for controlling data communications with the card reader 13 (FIG. 1). The encryption processing firmware 102 is software comprising an encryption processing function which generates the ARQC 105 and verifies the ARPC 107 sent from the accounting host computer 3.

Furthermore, the transaction data 104 is transaction telegram data for payout transactions and deposit transactions which is sent from the ATM 2 and is the same data as the transaction data 83 in FIG. 3.

The ARQC 105 is the same data as the ARQC 63 in FIG. 2 and the ARQC 84 in FIG. 3 and is a message authentication code for the transaction data 62 in FIG. 2. The ARQC 105 is verified by the accounting host computer 3. The transaction feasibility data 106 is data indicating the result obtained from the accounting host computer 3 determining whether a transaction has succeeded by referring to the bank account balance or credit information or the like and is the same data as the transaction feasibility data 64 in FIG. 2 and the transaction feasibility data 85 in FIG. 3.

The ARPC 107 is a message authentication code for the transaction feasibility data 106, is generated by the accounting host computer 3, and is the same data as the ARPC 65 in FIG. 2 and the ARPC 86 in FIG. 3. The transaction verification result 109 is data which is used to allow paper currency payout commands to be sent to the ATM control unit 10 as a result of the IC card 21 verifying the ARPC 107. Furthermore, the transaction verification result 109 is also used to enable the accounting host computer 3 to verify the fact that the IC card 21 has approved a transaction using the ATM 2 by verifying the ARPC 107. As the transaction verification result 109, 'TC' is generated when a transaction has been approved and 'AAC' is generated when the transaction has been denied.

The IC card 21 is equipped with functions for recording the bank account number or credit card number of the owner of the IC card 21 or information for performing personal authentication, and for generating and verifying a message authentication code that is required for ATM transactions with the accounting host computer 3.

An outline of the flow of payout transaction processing in a conventional automatic transaction system 1 will be explained next with reference to FIGS. 5A and 5B.

First, when the IC card 21 (FIG. 1) is inserted by the user of the ATM 2 into a card insert slot (not shown) provided in the front of the ATM 2, required information such as the card number recorded on the IC card 21 is sent from the IC card 21 to the ATM control unit 10 via the card reader 13 (S1).

Upon receiving information such as the card number (S2), the ATM control unit 10 sends a processing selection screen display instruction to the display unit 19 (S3). Furthermore, the display unit 19 displays the processing selection screen according to the display instruction (S4). The user of the ATM 2 thus operates the encrypting pin pad 14 to select a payout transaction as the transaction type (S5) and, as a result, the ATM control unit 10 starts the serial processing of the payout transaction (S6). Note that the selection of a payout transaction may also be selected by the display unit 19.

Upon starting the payout transaction processing, the ATM control unit 10 first sends a PIN input display instruction to the display unit 19 (S7). The display unit 19 then displays the PIN input screen according to the display instruction (S8). Furthermore, when the user of the ATM 2 inputs the PIN by operating the encrypting pin pad 14, the PIN is sent from the encrypting pin pad 14 to the ATM control unit 10 (S9) and personal authentication confirmation is performed between the ATM control unit 10 and the accounting host computer 3 based on the PIN (S10).

When this personal authentication confirmation succeeds, the ATM control unit 10 of the ATM 2 sends a payout amount input display instruction to the display unit 19 (S11). The display unit 19 then displays the payout amount input screen according to the display instruction (S12). Furthermore, when the user of the ATM 2 inputs the payout amount by using the encrypting pin pad 14, the encrypting pin pad 14 sends the payout amount to the ATM control unit 10 (S13).

Upon receiving the payout amount in this payout transaction (S14), the ATM control unit 10 sends the transaction data 62 (FIG. 2) required for this payout transaction to the IC card 21 via the card reader 13 (S15). Furthermore, upon receiving this transaction data 62, the IC card 21 stores same in the memory 91 (FIG. 4) (S16), generates the ARQC 105 which is a message authentication code for the transaction data 62, and sends the ARQC authentication code 105 thus generated to the ATM control unit 10 (S17).

Upon receiving this ARQC authentication code 105 (S18), the ATM control unit 10 stores the received authentication code ARQC 105 in the memory 31 (FIG. 2) as the ARQC 63 (FIG. 2) and sends the authentication code ARQC 105 to the accounting host computer 3 together with the transaction data 62 (FIG. 2) (S19).

Upon receiving this transaction data 62 and authentication code ARQC 105 (S20), the accounting host computer 3 stores same in the memory 71 (FIG. 3) as the transaction data 83 (FIG. 3) and authentication code ARQC 84 (FIG. 3) respectively. Moreover, the accounting host computer 3 confirms the account balance or credit information of the user, and after verifying the feasibility of performing the payout transaction based on the payout amount and account balance or credit information or the like, the accounting host computer 3 generates the transaction feasibility data 85 (FIG. 3) and ARPC 86 (FIG. 3) which is a message authentication code corresponding to same. Furthermore, the accounting host computer 3 sends back the generated transaction feasibility data 85 and authentication code ARPC 86 to the ATM control unit 10 (S21).

Upon receiving the foregoing transaction feasibility data 85 (FIG. 3) and authentication code ARPC 86 (FIG. 3) that have been sent back from the accounting host computer 3 (S22), the ATM control unit 10 stores same in the memory 31 (FIG. 2) as the transaction feasibility data 64 (FIG. 2) and authentication code ARPC 65 (FIG. 2) respectively, and then sends the authentication code ARPC 65 (FIG. 2) and transaction feasibility data 64 (FIG. 2) to the IC card 21 (S23).

Upon receiving the authentication code ARPC 65 and transaction feasibility data 64, the IC card 21 stores same in the memory 91 (FIG. 4) as the ARPC 107 (FIG. 4) and transaction feasibility data 106, verifies the legitimacy of the transaction feasibility data 106 based on the authentication code ARPC and stores the result in the memory 91 as the ARPC verification result 108 (FIG. 4) (S24). Moreover, the IC card 21 then sends the ARPC verification result 108 to the ATM control unit 10 (S25).

Upon receiving this ARPC verification result 108, the ATM control unit 10 stores the received ARPC verification result 108 in the memory 31 (FIG. 2) as the ARPC verification result 66 (FIG. 2) (S26). The ATM control unit 10 then refers to the content of the ARPC verification result 66 and, upon determining that the transaction has been accepted, regenerates the transaction data 62 (FIG. 2) according to the request of the IC card 21 and sends same to the IC card 21 (S27).

Upon receiving this transaction data 62 (S28), the IC card 21 stores same in the memory 31 (FIG. 2) as the transaction verification result 67 (FIG. 2). The IC card 21 generates the transaction verification result 109 (FIG. 4) as the message authentication code of this verification result and sends the generated transaction verification result 109 to the ATM control unit 10 via the card reader 13 (S29).

Upon receiving this transaction verification result 109, the ATM control unit 10 stores same in the memory 31 (FIG. 2) as the transaction verification result 67 (FIG. 2) (S30). Furthermore, when the transaction verification result 67 is 'AAC,' the ATM control unit 10 displays a transaction impossible message on the display unit 19 (FIG. 1) of the ATM 2.

However, when the value of the transaction verification result 67 is normal 'TC,' the ATM control unit 10 determines that the transaction has been accepted and generates a paper currency payout command which includes information on the paper currency denomination and number of notes to be paid out, stores the generated paper currency payout command in the memory 31 (FIG. 2) as paper currency processing unit control data 68 (FIG. 2) (S31), and sends this paper currency payout command to the paper currency processing unit 12 (S32).

Furthermore, upon receiving the paper currency payout command (S33), the paper currency processing unit 12 performs payout processing which withdraws paper currency in the denomination designated by the paper currency payout command in the designated number of notes from the receiving chamber which holds the paper currency enclosed in a safe provided in the ATM 2, based on the received paper currency payout command, and which transfers the notes to the dispensing port provided at the front of the ATM 2 (S34).

Thereafter, the ATM control unit 10 sends an instruction to the card reader 13 to return the IC card 21 (S35). Upon receiving the card return instruction (S36), the card reader 13 ejects the IC card 21 from the card insert slot and returns same to the user (S37).

The ATM control unit 10 sends a statement print command including transaction content to the receipt printer 15 (S38). Upon receiving the statement print command (S39), the receipt printer 15 prints the statement (S40).

The foregoing is an example of the flow of conventional ATM payout transaction processing.

Here, processing in which an unauthorized paper currency payout command of an unsubstantiated transaction is sent to the paper currency processing unit 12 may arise due to malware infiltrating the ATM application software 40 (FIG. 2) of the ATM control unit 10. That is, the flow of processing essentially involves the ATM control unit 10 generating a paper currency payout command based on the transaction verification result 67 (FIG. 2) which is stored in the memory 31 (FIG. 2) invariably via the insertion of the IC card 21 and a PIN input operation of the encrypting pin pad 14, or the like. The act of guaranteeing the foregoing constitutes legitimacy for the ATM application software 40.

However, when legitimacy of the ATM application software 40 is not secured due to a malware invasion, an unauthorized paper currency payout command is sent to the paper currency processing unit 12 without being based on the transaction verification result 67. In this case, the payout amount in the paper currency payout command has been falsified and a paper currency payout command which is completely unrelated to the transaction is sent to the paper currency processing unit 12 and an unauthorized paper currency payout is performed.

Moreover, in another case, when legitimacy of the ATM application software 40 is not secured due to a malware invasion, a card return command which is essentially sent after a transaction is complete is not sent and the IC card 21 stays in the ATM 2, making it impossible for the user to receive the IC card 21. Thereafter, as a result of the criminal inputting, after the user has left, a combination which is not normally input to the encrypting pin pad 14 together with a number representing a quantity of notes, a card return command is sent to the card reader 13 and the criminal is able to illegally exploit the user's IC card 21.

Furthermore, in another case, when legitimacy of the ATM application software 40 is not secured due to a malware invasion, by inserting an unauthorized card which sends special card information instead of the IC card 21 which performs legitimate transactions, a card data write command is sent to the card reader 13 and the information of card number 60 which has been saved in the data area 33 of the memory 31 of the ATM control unit 10 is written to the unauthorized card and the criminal is able to illegally exploit a large quantity of card information.

Furthermore, in another case, when legitimacy of the ATM application software 40 is not secured due to a malware invasion, by inserting an unauthorized card which sends special card information instead of the IC card 21 which performs legitimate transactions and inputting a combination which is not normally input to the encrypting pin pad 14 together with a number representing a quantity of notes, a printer print command is sent to the receipt printer 15 to cause the receipt printer 15 to print the information of the card number 60 saved to the data area 33 of the memory 31 of the ATM control unit 10, and the criminal is able to illegally exploit a large quantity of card information.

In addition, as security countermeasure software for preventing the illegal falsification of the ATM application software 40, the nine types of module control software shown in FIG. 2 (the I/O control unit control software 41, paper currency processing unit control software 42, card reader control software 43, encrypting pin pad control software 44, receipt printer control software 45, passbook printer control software 46, journal printer control software 47, monitoring camera control software 48 and communication processing software 49) and the software environment software configuration file 50, there conventionally exist virus check software for detecting the invasion of a virus and security countermeasure software for preventing software other than registered software known as whitelist-type software from launching, however, when the overall control unit (ATM control unit 10) starts up, there are also cases where illegal remodeling to hinder the launch of the security countermeasure software and prevent same from functioning is executed, and this countermeasure software alone is not a panacea.

According to this embodiment, an automatic transaction system is proposed with which unauthorized processing is impossible, even when the ATM application software 40 and module control software and the like have been illegally falsified by malware, as a result of any of the encrypting pin pad 14, card reader 13, paper currency processing unit 12, receipt printer 15 and the additional newly installed security control unit 112 (FIG. 6) in the ATM 2 issuing an operation approval signature approving module operation in the ATM 2. The automatic transaction system according to this embodiment will be explained hereinbelow with reference to FIGS. 6 to 11.

Figure 5B:
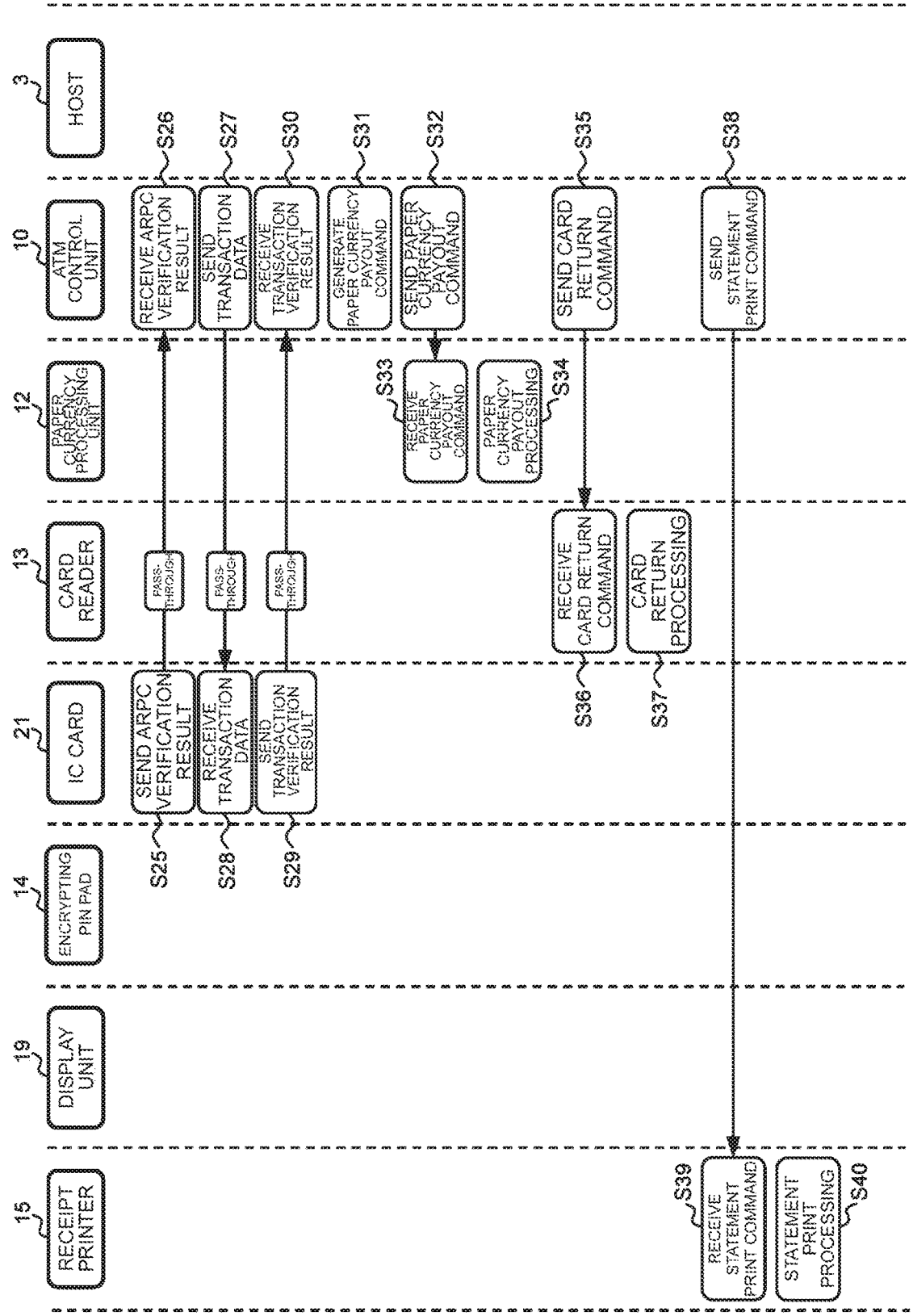
FIG. 5B is a sequence diagram showing the flow of payout transaction processing in a conventional automatic transaction system.
Figure 6:
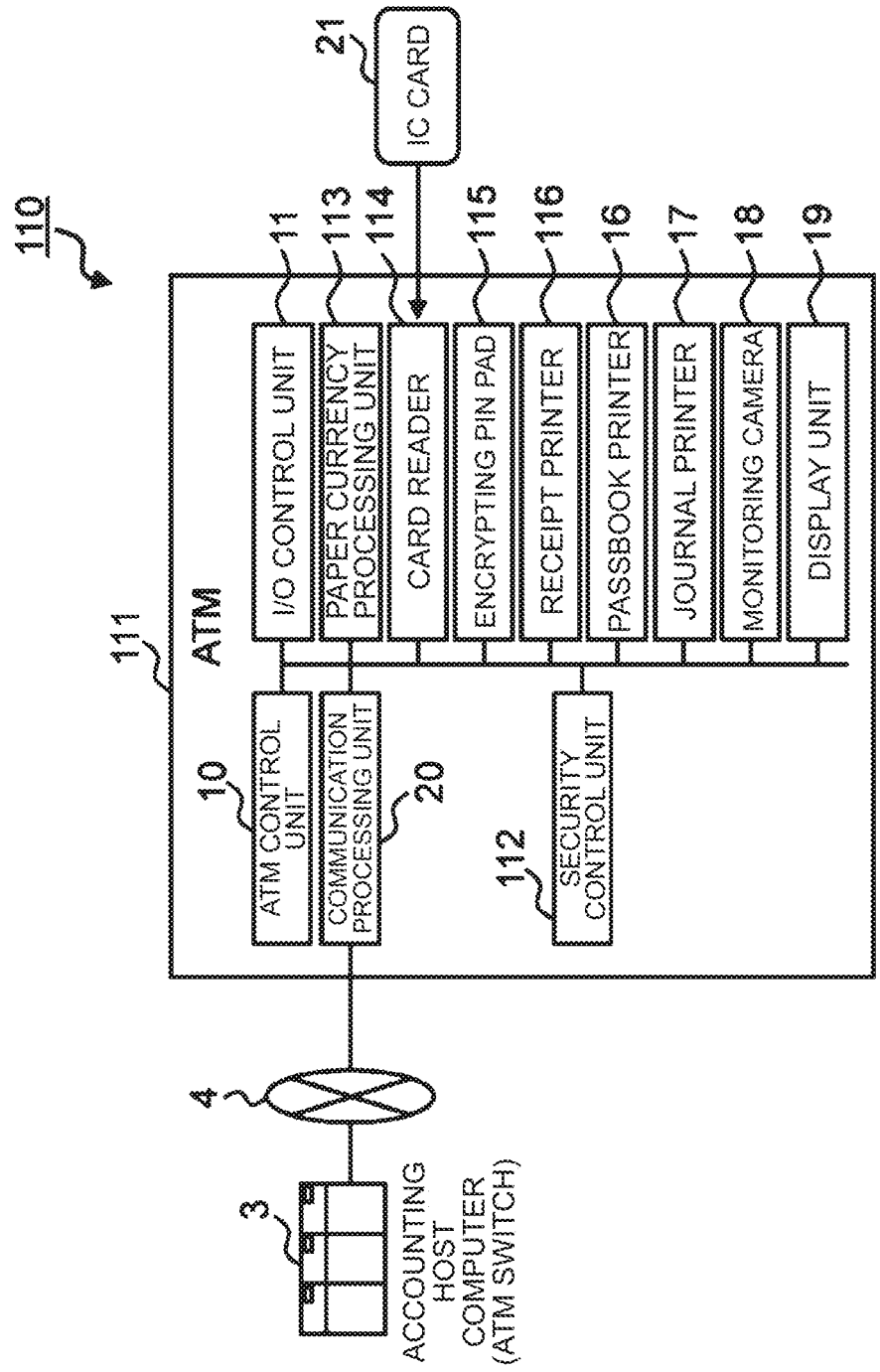
FIG. 6 is a block diagram showing an overall configuration example of an automatic transaction system according to a first embodiment.

(1-2) Configuration of the Automatic Transaction Apparatus According to the First Embodiment In FIG. 6, in which the same reference signs are shown assigned to parts corresponding to parts in FIG. 1, 110 denotes the overall automatic transaction system according to this embodiment. This automatic transaction system 110 is configured similarly to the conventional automatic transaction system 1 of FIGS. 1 to 5B except that the functions of a paper currency processing unit 113, card reader 114, encrypting pin pad 115 and receipt printer 116 of an ATM 111 are different and that a security control unit 112, which determines whether a transaction is a legitimate transaction by comparing the flow of processing that is performed in a real transaction with the flow of processing that is performed in a legitimate transaction, has been newly added to the ATM 111.

FIG. 7 shows a schematic configuration of the security control unit 112. The security control unit 112 is configured by comprising a communication monitoring unit 201, a real processing flow list holding unit 202, a legitimate processing flow list holding unit 203 and an operation approval signature issuing unit 204.

The communication monitoring unit 201 is a module which has a function for monitoring communications between the ATM control unit 10 and the paper currency processing unit 113, card reader 114, encrypting pin pad 115, and the receipt printer 116 and the like, in the ATM 111. Note that the communication monitoring unit 201 may have either a hardware configuration or a software configuration, for example. For example, when the communication monitoring unit 201 has a software configuration, the security control unit 112 may have a configuration comprising information processing resources such as a CPU and a memory, and the communication monitoring unit 201 may be embodied as a function as a result of the CPU executing programs which are stored in the memory. The same may also be said of the operation approval signature issuing unit 204.

Moreover, the real processing flow list holding unit 202 is a module such as a storage device which comprises a storage area for saving, as a list (hereinbelow called a real processing flow list 205), the content of serial processing from when the user transaction is started (step S1 in FIG. 5A) until step S38 in FIG. 5B and which content is acquired by means of this communication monitoring. In reality, the real processing flow list 205 records, in order of exchanged signals, the content of each signal which includes the commands and various information and the like which the ATM control unit 10 actually exchanges with each of the modules of the paper currency processing unit 12, card reader 13, IC card 21, encrypting pin pad 14, display unit 19, and receipt printer 15 and the like in the serial processing from the start of the user transaction until step S38 of FIG. 5B.

In addition, the legitimate processing flow list holding unit 203 is a module such as a storage device which comprises a storage area for saving the legitimate paper currency payout processing flow list 206, legitimate card return processing flow list 207, legitimate statement print processing flow list 208, and legitimate card data write processing flow list 209 which are lists for recording the content of serial processing from the start of the user transaction at the time of legitimate payout transaction processing described by using FIG. 5A and FIG. 5B until the paper currency payout processing of step S32, the card return processing of step S35, or the statement print processing of step S38 respectively. In the foregoing case, the legitimate processing flow list holding unit 203 may be the same storage device as the real processing flow list holding unit 202.

In reality, the legitimate paper currency payout processing flow list 206 pre-records, in order of exchanged signals, the content of each signal which includes the commands and various information which the ATM control unit 10 exchanges with the paper currency processing unit 12, IC card 21, encrypting pin pad 14, and display unit 19 in the serial processing from the start of the user transaction at the time of legitimate payout transaction processing until the paper currency payout processing of step S32.

Furthermore, the legitimate card return processing flow list 207 pre-records, in order of exchanged signals, the content of each signal which includes the commands and various information which the ATM control unit 10 exchanges with the paper currency processing unit 12, card reader 13, IC card 21, encrypting pin pad 14, and display unit 19 in the serial processing from the start of the user transaction at the time of legitimate payout transaction processing until the card return processing of step S35.

Furthermore, the legitimate statement print processing flow list 208 pre-records, in order of exchanged signals, the content of each signal which includes the commands and various information which the ATM control unit 10 exchanges with the paper currency processing unit 12, card reader 13, IC card 21, encrypting pin pad 14, display unit 19, and receipt printer 15 in the serial processing from the start of the user transaction at the time of legitimate payout transaction processing until the statement print processing of step S38.

Furthermore, although not shown, the legitimate card data write processing flow list 209 pre-records, in order of exchanged signals, the content of each signal which includes the commands and various information which the ATM control unit 10 exchanges with the card reader 13 in the serial processing from the start of the processing at the time of legitimate processing until information such as a card number is written to the IC card 21.

In addition, the operation approval signature issuing unit 204 is a module which has a function for issuing a signature authorizing the operation of a module only when the real processing flow list 205 matches the processing content saved in the legitimate processing flow list holding unit 203.

Figure 8B:
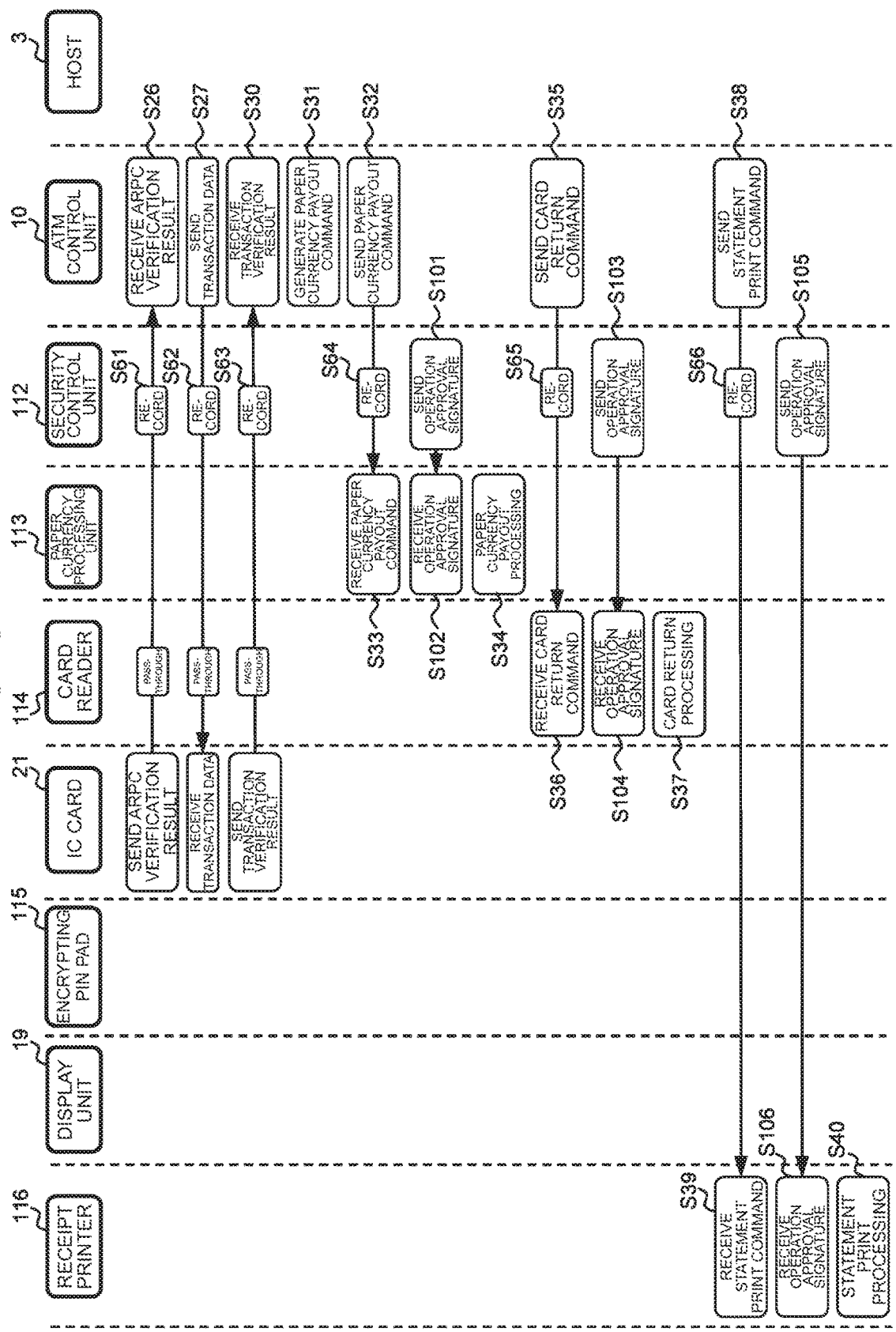
FIG. 8B is a sequence diagram showing the flow of payout transaction processing in an automatic transaction system according to the first embodiment.

(1-3) Flow of Payout Transaction Processing in the Automatic Transaction Apparatus According to this Embodiment An outline of the flow of payout transaction processing according to this embodiment will be explained next with reference to FIGS. 8A and 8B in which the same reference signs have been assigned to parts corresponding to parts of FIGS. 5A and 5B.

Foremost, the IC card 21 is inserted by the user of the ATM 111 into the card reader 114 (FIG. 6) via a card insert slot (not shown) and the ATM control unit 10 acquires the card number stored on the IC card 21 via the card reader 114 (S1, S2). Here, the security control unit 112 records the content of a signal that has been sent from the IC card 21 to the ATM control unit 10 in the real processing flow list holding unit 202 as a portion of the real processing flow list 205 (FIG. 7) (S51). Note that this recording is actually performed by the communication monitoring unit 201 (FIG. 7) of the security control unit 112 but is explained in the ensuing explanation as the processing of the security control unit 112 to facilitate understanding.

Thereafter, the ATM control unit 10 of the ATM 111 sends a processing selection screen display instruction to the display unit 19 (S3) and the display unit 19 displays the processing selection screen according to this display instruction (S4). The user of the ATM 111 thus selects a payout transaction as the transaction content (S5) and, as a result, the ATM control unit 10 starts the serial processing of the payout transaction (S6). Here, the security control unit 112 records the content of the signals (commands and information and the like) which are exchanged between the ATM control unit 10 and the display unit 19 and between the encrypting pin pad 115 and the ATM control unit 10, in the real processing flow list holding unit 202 as a portion of the real processing flow list 205 (S52, S53).

Subsequently, the processing is similar to the flow of conventional processing except for the fact that, in the serial processing after the ATM control unit 10 sends a PIN input display instruction to the display unit 19 in step S7 until the ATM control unit 10 sends a paper currency payout command to the paper currency processing unit 113 in step S32, the security control unit 112 records (S54 to S63) the content of each of the signals (commands and information) which are exchanged between the ATM control unit 10 and the other modules (the display unit 19, encrypting pin pad 115, IC card 21 or paper currency processing unit 113) in the real processing flow list holding unit 202 as a portion of the real processing flow list 205. Here, the security control unit 112 may include card number information, PIN number digits, digits input to the encrypting pin pad 115, transaction data, transaction feasibility data, verification results and process steps, and so forth, as the content of the signals recorded as a portion of the real processing flow list 205.

Furthermore, when the ATM control unit 10 sends the paper currency payout command to the paper currency processing unit 113 in step S32, the security control unit 112 records the content of the signal (paper currency payout command) sent from the ATM control unit 10 to the paper currency processing unit 113 at this time in the real processing flow list holding unit 202 as a portion of the real processing flow list 205 (S64).

Furthermore, the security control unit 112 compares the content of the real processing flow list 205 (FIG. 7) recorded in the real processing flow list holding unit 202 thus far with the content of the legitimate paper currency payout processing flow list 206 which is saved in the legitimate processing flow list holding unit 203. Furthermore, the security control unit 112 sends the operation approval signature to the paper currency processing unit 113 only when there is a match between the content of the real processing flow list 205 and the content of the legitimate paper currency payout processing flow list 206 (S101). Note that this comparison and sending of an operation approval signature is actually performed by the communication monitoring unit 201 (FIG. 7) of the security control unit 112 but is also explained in the ensuing explanation as the processing of the security control unit 112 to facilitate understanding.

Furthermore, the paper currency processing unit 113 performs payout processing which withdraws paper currency in the denomination designated by the paper currency payout command in the number of notes designated by the paper currency payout command from the receiving chamber and transfers the notes to the deposit port provided at the front of the ATM 111 (S34) only when the paper currency payout command from the ATM control unit 10 has been received (S33) and the operation approval signature from the security control unit 112 has been received (S102).

Thereafter, the ATM control unit 10 sends an instruction to the card reader 114 to return the card (S35). Here, the security control unit 112 records the respective content of the signal (command instructing card return), which was sent from the ATM control unit 10 to the card reader 114, in the real processing flow list holding unit 202 as a portion of the real processing flow list 205 (S65).

Moreover, the security control unit 112 then compares the content of the real processing flow list 205 (FIG. 7) recorded thus far with the content of the legitimate card return processing flow list 207 saved in the legitimate processing flow list holding unit 203, and sends the operation approval signature to the card reader 114 only when there is a match between the foregoing content (S103).

The card reader 114 ejects the IC card 21 which is in the card reader 114 from the card insert slot and returns same to the user (S37) only when the card return instruction has been received (S36) and the operation approval signature has been received (S104).

The ATM control unit 10 then sends a statement print command including transaction content to the receipt printer 116 (S38). Here, the security control unit 112 records the content of the signal (print command) sent from the ATM control unit 10 to the receipt printer 116 at this time in the real processing flow list holding unit 202 as a portion of the real processing flow list 205 (S66).

Moreover, the security control unit 112 then compares the content of the real processing flow list 205 (FIG. 7) recorded thus far with the content of the legitimate statement print processing flow list 208 (FIG. 7) saved in the legitimate processing flow list holding unit 203, and sends the operation approval signature to the receipt printer 116 only when there is a match between the former and latter content items (S105).

Further, the receipt printer 116 prints the statement including the transaction content (S40) only when the statement print command has been received (S39) and the operation approval signature has been received (S106).

Note that the communication monitoring unit 201 of the security control unit 112 saves the content recorded in the real processing flow list 205 thus far as unauthorized processing in addition to not issuing the foregoing operation approval signature when, in step S101, step S103 and step S105, there is no match between the content of the real processing flow list 205 and the content of the legitimate paper currency payout processing flow list 206, legitimate card return processing flow list 207 or legitimate statement print processing flow list 208.

(1-4) Operation in Event of Unauthorized Processing According to the First Embodiment Here, processing in which an unauthorized paper currency payout command of an unsubstantiated transaction is sent to the paper currency processing unit 113 may arise due to malware infiltrating the ATM application software 40 (FIG. 2) of the ATM control unit 10. However, when the payout amount in the paper currency payout command has been falsified and a paper currency payout command that is completely unrelated to a transaction has been sent to the paper currency processing unit 12, because there is no match between the content of the real processing flow list 205 (FIG. 7) recorded thus far and the content of the legitimate paper currency payout processing flow list 206, the security control unit 112 does not send the operation approval signature to the paper currency processing unit 113. Therefore, in the foregoing case, the paper currency payout processing by the paper currency processing unit 113 is not performed and an unauthorized payout can be prevented from being performed.

Moreover, in another case, after a card return command which is essentially sent after a transaction is complete is sent but the IC card 21 remains in the ATM 111 and the user has left, when a card return command has been sent to the card reader 114 as a result of a criminal inputting a combination which is not normally input to the encrypting pin pad 115 together with a number representing a quantity of notes, the security control unit 112 does not send the operation approval signature to the card reader 114 because there is no match between the content of the real processing flow list 205 (FIG. 7) recorded thus far by the security control unit 112 and the content of the legitimate card return processing flow list 207. Therefore, in the foregoing case, because the card return processing by the card reader 114 is not performed, the IC card 21 can be prevented from being illegally exploited by a criminal.

Furthermore, in another case, even when a command to write information such as the card number 60 saved by the ATM control unit 10 in the data area 33 of the memory 31 of the ATM control unit 10 has been sent to the card reader 114 by inserting an unauthorized card which sends special card information instead of the IC card 21 which performs legitimate transactions, the security control unit 112 does not send the operation approval signature to the card reader 114 because there is no match between the content of the real processing flow list 205 (FIG. 7) recorded thus far by the security control unit 112 and the content of the legitimate card data write processing flow list 209. Therefore, in the foregoing case, because the processing to write information such as the card number 60 to the unauthorized card by the card reader 114 is not performed, it is possible to prevent the information on the user's IC card 21 from being illegally exploited by a criminal.

Furthermore, in another case, even when a command to print information such as the card number 60 saved in the data area 33 of the memory 31 of the ATM control unit 10 has been issued by malware as a result of inserting an unauthorized card which sends special card information instead of the IC card 21 which performs legitimate transactions and inputting a combination which is not normally input to the encrypting pin pad 115 together with a number representing a quantity of notes, the security control unit 112 does not send the operation approval signature to the receipt printer 116 because there is no match between the content of the real processing flow list 205 (FIG. 7) recorded thus far by the security control unit 112 and the content of the legitimate statement print processing flow list 208. Therefore, in the foregoing case, because the transaction statement print processing by the receipt printer 116 is not performed, a large quantity of card information can be prevented from being illegally exploited by a criminal.

(1-5) Effects of this Embodiment

As described hereinabove, in the automatic transaction system 110 of this embodiment, the security control unit 112, which holds various legitimate processing flow lists such as the legitimate paper currency payout processing flow list 206 in which the content of each of the signals exchanged between the ATM control unit 10 and the IC card 21 and other modules (the display unit 19, paper currency processing unit 113, card reader 114, encrypting pin pad 115 and receipt printer 116) when a transaction is legitimately performed has been pre-registered, is provided separately from the ATM control unit 10, and the security control unit 112 sequentially records the content of each of the signals exchanged between the ATM control unit 10 and each of the modules (the display unit 19, paper currency processing unit 113, card reader 114, encrypting pin pad 115 and receipt printer 116) at the time of a transaction in the real processing flow list 205.

Moreover, when the ATM 111 executes the paper currency payout processing, card return processing or print processing and writes data to the IC card 21, the security control unit 112 compares the content of the real processing flow list 205 with the content of the legitimate paper currency payout processing flow list 206, legitimate card return processing flow list 207, legitimate statement print processing flow list 208 and legitimate card data write processing flow list 209, and outputs the operation approval signature of the paper currency payout processing, card return processing, print processing and the processing to write data to the IC card 21 only when there is a match between the foregoing content. Furthermore, these modules execute the paper currency payout processing, card return processing, print processing or the processing to write data to the IC card 21 only when the operation approval signature from the security control unit 112 is received.

Therefore, according to this embodiment, it is possible to realize a highly reliable automatic transaction system which is capable of preventing an unauthorized payout from being performed, the user's IC card 21 from being illegally exploited by a criminal, the information on the user's IC card 21 from being illegally exploited by a criminal, and a large quantity of card information from being illegally exploited by a criminal.

Figure 9:
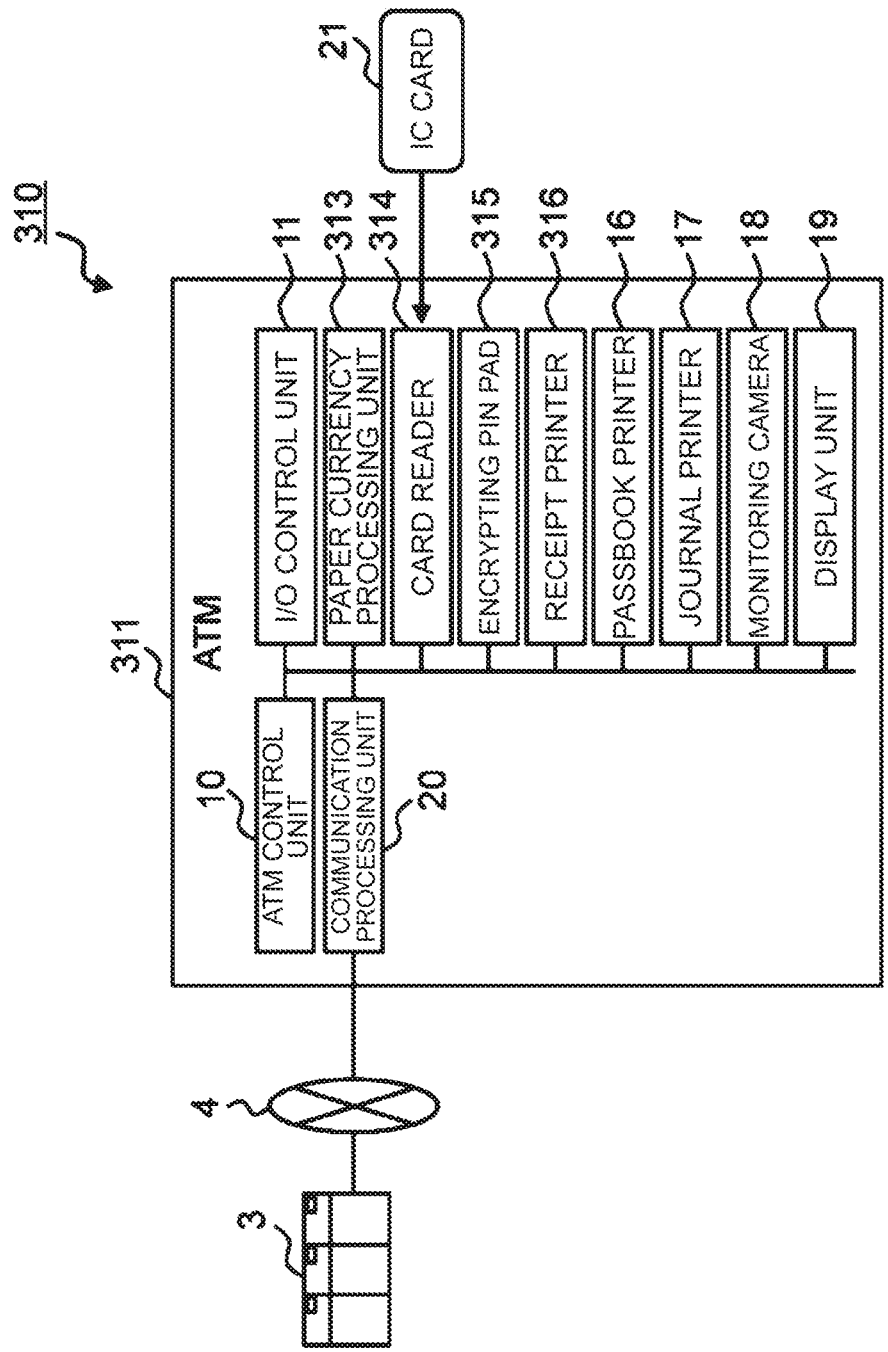
FIG. 9 is a block diagram showing an overall configuration example of an automatic transaction system according to a second embodiment.

(2) Second Embodiment (2-1) Configuration of Transaction System According to the Second Embodiment In FIG. 9, in which the same reference signs are shown assigned to parts corresponding to parts in FIG. 1, 310 denotes the overall automatic transaction system according to the second embodiment. This automatic transaction system 310 is configured similarly to the conventional automatic transaction system 1 described hereinabove with reference to FIGS. 1 to 5B except for the fact that the functions of a paper currency processing unit 313, card reader 314, encrypting pin pad 315, and receipt printer 316 of the ATM 311 are different.

Figure 10:
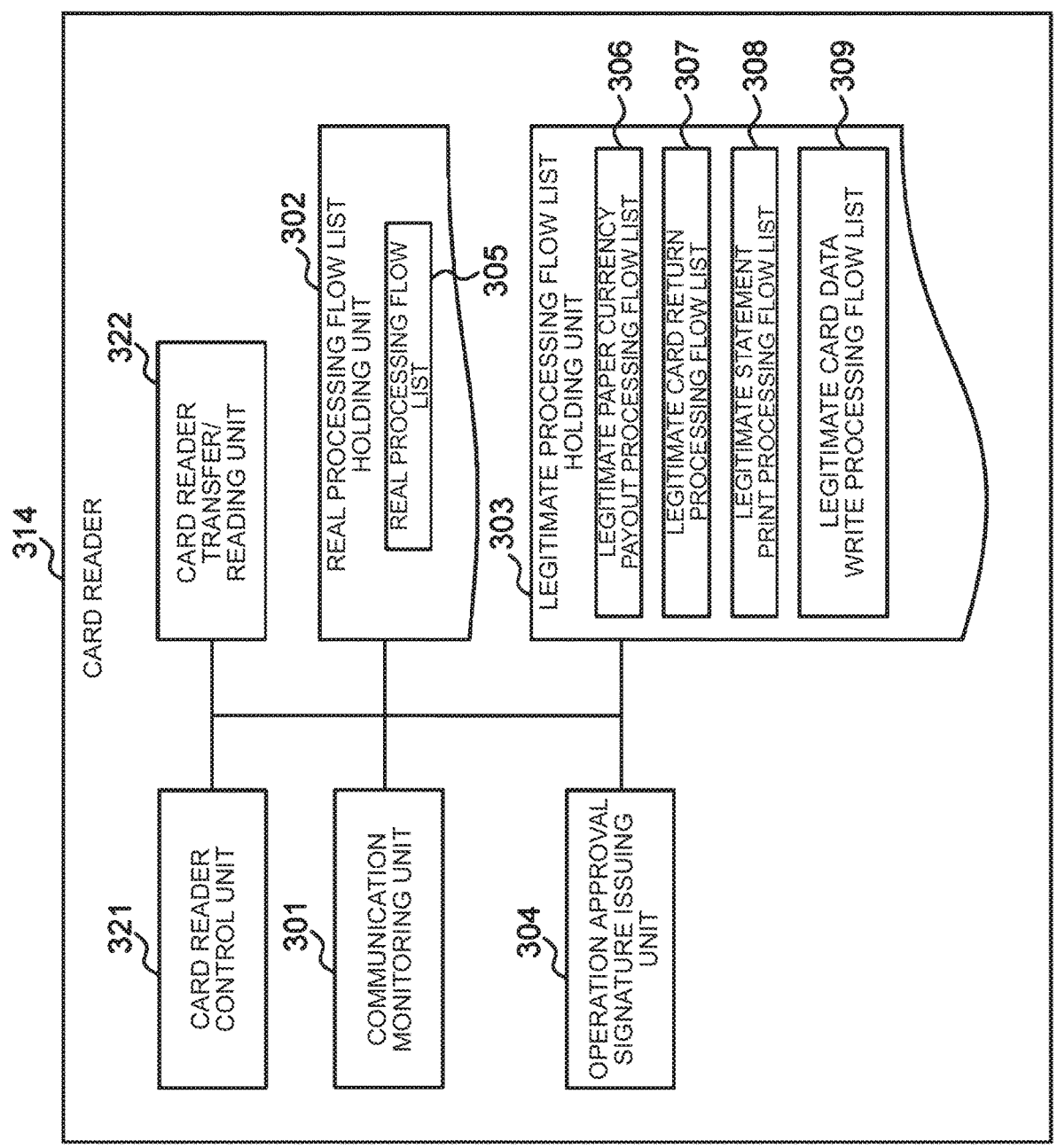
FIG. 10 is a block diagram showing a configuration example of a card reader according to the second embodiment.

FIG. 10 shows a configuration of the card reader 314 according to this embodiment. The card reader 314 is configured comprising a communication monitoring unit 301, a real processing flow list holding unit 302, a legitimate processing flow list holding unit 303 and an operation approval signature issuing unit 304 in addition to a card reader control unit 321 which is tasked with controlling the overall operation of the card reader 314, and a card reader transfer/reading unit 322 which transfers the IC card 21 inserted in the card insert slot and reads information from the IC card 21.

The communication monitoring unit 301 is a module which monitors communications between the ATM control unit 10 and the paper currency processing unit 313, card reader 314, encrypting pin pad 315, and receipt printer 316 and the like, in the ATM 311.

Moreover, the real processing flow list holding unit 302 is a module which comprises a storage area for saving, as a real processing flow list 305, the content of serial processing from when the user transaction is started (step S1 in FIG. 5A) until step S38 in FIG. 5B and which content is acquired by means of this communication monitoring. Note that the real processing flow list 305 includes content which is similar to the real processing flow list 205 of the first embodiment.

In addition, the legitimate processing flow list holding unit 303 is a module which comprises a storage area for saving the legitimate paper currency payout processing flow list 306, legitimate card return processing flow list 307, legitimate statement print processing flow list 308 and legitimate card data write processing flow list 309 in which the content of the serial processing from the start of the user transaction at the time of legitimate payout transaction processing described by using FIG. 5A and FIG. 5B until the paper currency payout processing of step S32, the card return processing of step S35, and the statement print processing of step S38 has been pre-registered.

Note that the legitimate paper currency payout processing flow list 306, legitimate card return processing flow list 307, legitimate statement print processing flow list 308 and legitimate card data write processing flow list 309 include content which is similar to the legitimate paper currency payout processing flow list 206, legitimate card return processing flow list 207, legitimate statement print processing flow list 208, and legitimate card data write processing flow list 209 according to the first embodiment.

In addition, the operation approval signature issuing unit 304 is a module which has a function for issuing a signature authorizing the operation of a module only when the real processing flow list 305 matches the processing content saved in the legitimate processing flow list holding unit 303.

Figure 11A:
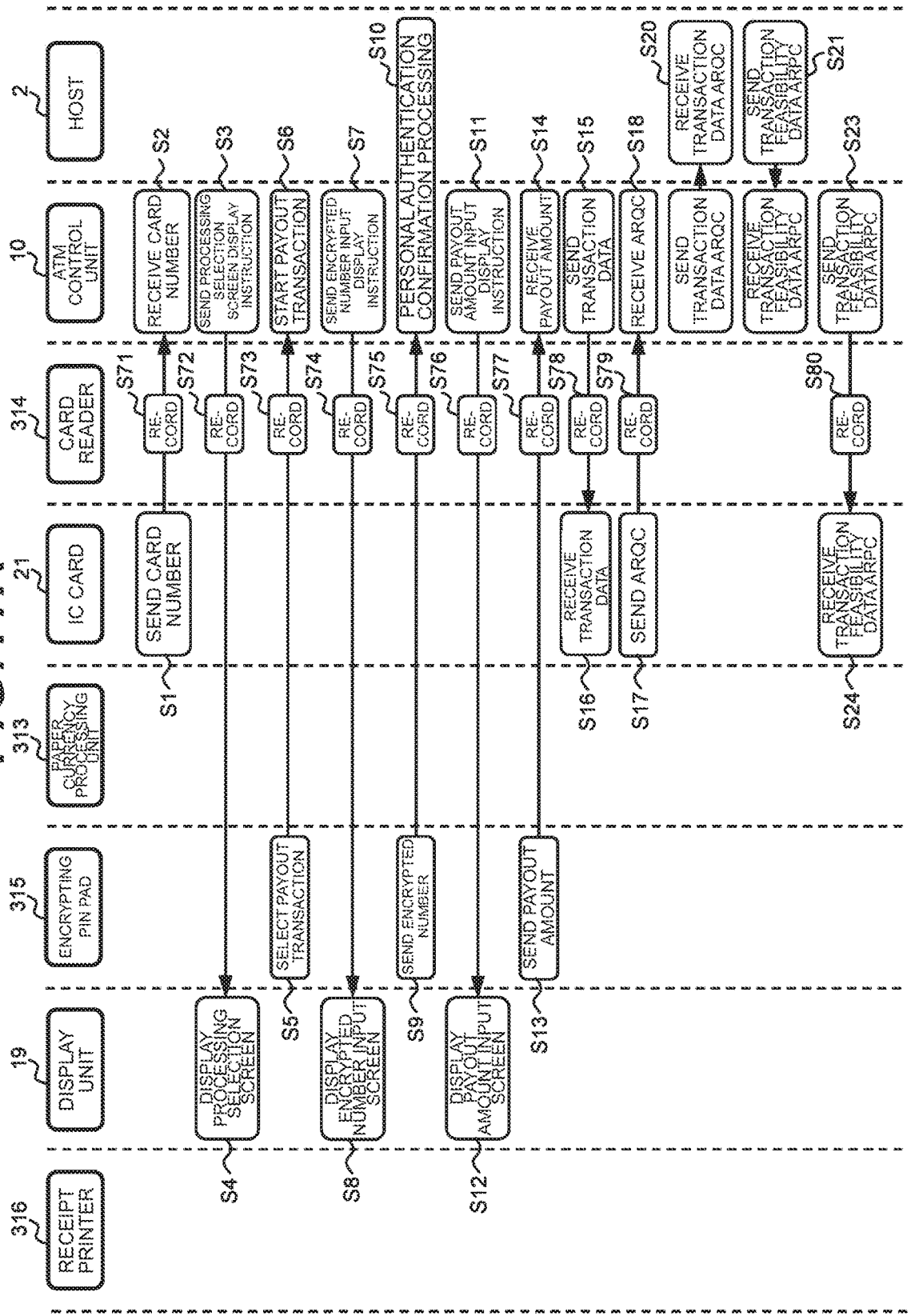
FIG. 11A is a sequence diagram showing the flow of payout transaction processing in an automatic transaction system according to the second embodiment.

(2-2) Flow of Payout Transaction Processing in the Automatic Transaction Apparatus According to this Embodiment An outline of the flow of payout transaction processing according to this embodiment will be explained next with reference to FIGS. 11A and 11B in which the same reference signs have been assigned to parts corresponding to parts of FIGS. 5A and 5B.

First, when the IC card 21 is inserted by the user of the ATM 311 into a card insert slot (not shown) provided in the front of the ATM 311, required information such as the card number recorded on the IC card 21 is sent from the IC card 21 to the ATM control unit 10 via the card reader 314 (S1).

Here, the card reader 314 records the content of the signal sent from the IC card 21 to the ATM control unit 10 as a portion of the real processing flow list 305 (FIG. 10) (S71). Note that this recording is actually performed by the communication monitoring unit 301 (FIG. 10) of the card reader 314 but is explained in the ensuing explanation as the processing of the card reader 314 to facilitate understanding.

Upon receiving information such as the card number (S2), the ATM control unit 10 sends a processing selection screen display instruction to the display unit 19 (S3). Furthermore, the display unit 19 displays the processing selection screen according to the display instruction (S4). The user of the ATM 311 thus operates the encrypting pin pad 315 to select a payout transaction as the transaction type (S5) and, as a result, the ATM control unit 10 starts the serial processing of the payout transaction (S6). Here, the card reader 314 records the content of the signals (commands and information and the like) which are exchanged between the ATM control unit 10 and the display unit 19 and between the encrypting pin pad 315 and the ATM control unit 10 at the time, in the real processing flow list holding unit 302 as a portion of the real processing flow list 305 (S72, S73).

Subsequently, the processing is similar to the flow of conventional processing except for the fact that, in the serial processing after the ATM control unit 10 sends a PIN input display instruction to the display unit 19 in step S7 (S7) until the ATM control unit 10 sends a paper currency payout command to the paper currency processing unit 313 in step S32, the card reader 314 records (S74 to S83) the content of each of the signals (commands and information) which are exchanged between the ATM control unit 10 and the other modules (the display unit 19, encrypting pin pad 315, IC card 21 or paper currency processing unit 313) in the real processing flow list holding unit 302 as a portion of the real processing flow list 305. Note that this recording is actually performed by the communication monitoring unit 301 (FIG. 10) of the card reader 314 but is explained in the ensuing explanation as the processing of the card reader 314 to facilitate understanding. Furthermore, the card reader 314 may include card number information, PIN number digits, digits input to the encrypting pin pad 315, transaction data, transaction feasibility data, verification results and process steps, and so forth, as the content of the signals recorded as a portion of the real processing flow list 305.

Furthermore, when the ATM control unit 10 sends the paper currency payout command to the paper currency processing unit 313 in step S32, the communication monitoring unit 301 of the card reader 314 records the content of the signal (paper currency payout command) sent from the ATM control unit 10 to the paper currency processing unit 313 at this time in the real processing flow list holding unit 302 as a portion of the real processing flow list 305 (S84).

Furthermore, the card reader 314 compares the content of the real processing flow list 305 (FIG. 10) recorded in the real processing flow list holding unit 302 thus far with the content of the legitimate paper currency payout processing flow list 306 which is saved in the legitimate processing flow list holding unit 303. Further, the card reader 314 sends the operation approval signature to the paper currency processing unit 313 only when there is a match between the content of the real processing flow list 305 and the content of the legitimate paper currency payout processing flow list 306 (S101). Note that this comparison and sending of the operation approval signature is actually performed by the communication monitoring unit 301 (FIG. 10) of the card reader 314 but is also explained in the ensuing explanation as the processing of the card reader 314 to facilitate understanding.

Furthermore, the paper currency processing unit 313 performs payout processing which withdraws paper currency in the denomination designated by the paper currency payout command in the number of notes designated by the paper currency payout command from the receiving chamber and transfers the notes to the deposit port provided at the front of the ATM 311 (S34) only when the paper currency payout command from the ATM control unit 10 has been received (S33) and the operation approval signature from the card reader 314 has been received (S102).

Thereafter, the ATM control unit 10 sends an instruction to the card reader 314 to return the card (S35). Moreover, upon receiving the return instruction (S36), the card reader 314 compares the content of the real processing flow list 305 (FIG. 10) recorded in the real processing flow list holding unit 302 thus far with the content of the legitimate card return processing flow list 307 saved in the legitimate processing flow list holding unit 303, and generates the operation approval signature only when there is a match between the foregoing content (S103).

Further, the card reader 314 ejects the IC card 21 from the card insert slot and returns same to the user (S37) only when the instruction to return the IC card 21 has been received (S36) and the operation approval signature has been generated.

The ATM control unit 10 then sends a statement print command including transaction content to the receipt printer 316 (S38). Here, the card reader 314 records the content of the signal (print command) sent from the ATM control unit 10 to the receipt printer 316 at this time in the real processing flow list holding unit 302 as a portion of the real processing flow list 305 (S86).

Moreover, the card reader 314 then compares the content of the real processing flow list 305 (FIG. 10) recorded thus far with the content of the legitimate statement print processing flow list 308 (FIG. 10) saved in the legitimate processing flow list holding unit 303, and sends the operation approval signature to the receipt printer 316 only when there is a match between the foregoing content (S105).

Further, the receipt printer 316 prints the statement including the transaction content (S40) only when the statement print command has been received (S39) and the operation approval signature has been received (S106).

Note that the communication monitoring unit 301 of the card reader 314 saves the content recorded in the real processing flow list 305 thus far as unauthorized processing in addition to not issuing the foregoing operation approval signature when, in step S101, step S103 and step S105, there is no match between the content of the real processing flow list 305 and the content of the legitimate paper currency payout processing flow list 306, legitimate card return processing flow list 307 or legitimate statement print processing flow list 308.

(2-2) Operation and Effects of this Embodiment

Here, even when processing in which an unauthorized paper currency payout command is sent to the paper currency processing unit 313, processing in which a card return command is sent with timing that is different from the timing of a legitimate transaction, processing in which a command to write information such as the card number 60 to an unauthorized card is sent, or processing in which a command to print information such as the card number 60 on the receipt printer 316 is sent is executed as a result of malware invading the ATM application software 40 (FIG. 2) of the ATM control unit 10, because the real processing flow list 305 (FIG. 10) recorded by the card reader 314 does not match the legitimate paper currency payout processing flow list 306, legitimate card return processing flow list 307, legitimate card data write processing flow list 309 or legitimate statement print processing flow list 308 which are saved in the legitimate processing flow list holding unit 303, the card reader 314 does not generate the operation approval signature and is capable of preventing illegal activity. Therefore, according to this embodiment, it is possible to realize a highly reliable automatic transaction system similar to that of the first embodiment.

Figure 12:
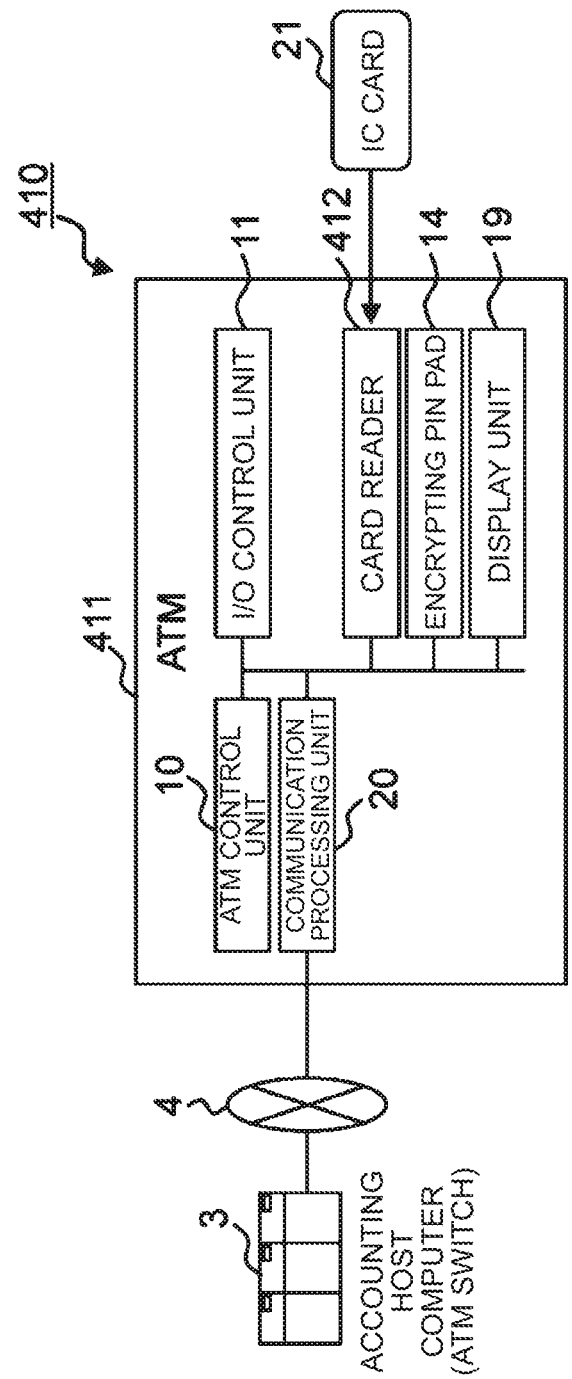
FIG. 12 is a block diagram showing an overall configuration example of an automatic transaction system according to a third embodiment.

(3) Third Embodiment (3-1) Configuration of Automatic Transaction System According to this Embodiment FIG. 12, in which the same reference signs are shown assigned to parts corresponding to parts in FIG. 1, shows an automatic transaction system 410 according to a third embodiment. This automatic transaction 410 is configured similarly to the conventional automatic transaction system 1 described hereinabove with reference to FIG. 1 except for the fact that the configuration of a card reader 412 of an ATM 411 is different. Note that although, for the sake of a clear explanation, the paper currency processing unit 12, receipt printer 15, passbook printer 16, journal printer 17, and monitoring camera 18 which were explained in FIG. 1 have been omitted from FIG. 12, it goes without saying that the ATM 411 of this embodiment also comprises these modules.

Figure 13:
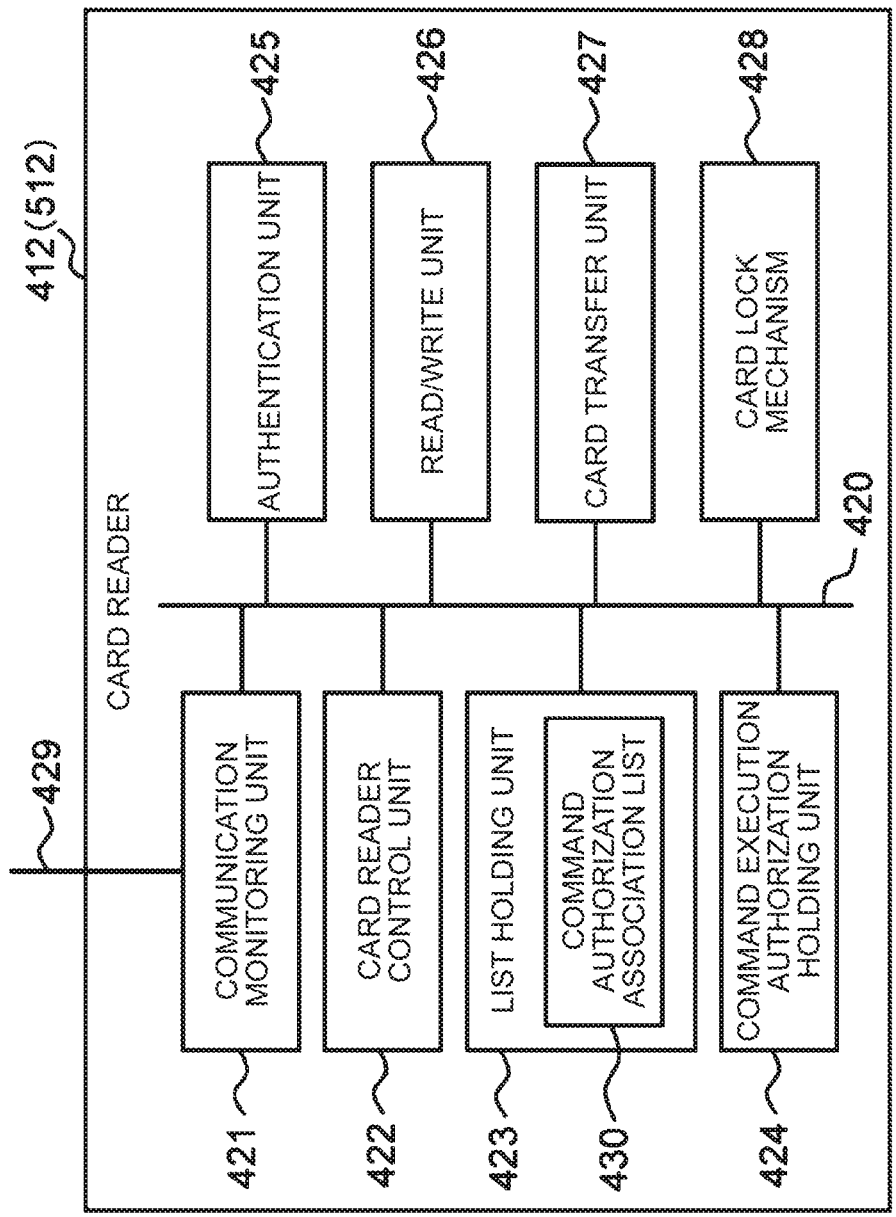
FIG. 13 is a block diagram showing a configuration example of a card reader according to the third embodiment.

FIG. 13 shows a schematic configuration of the card reader 412 according to this embodiment. The card reader 412 according to this embodiment is configured comprising a communication monitoring unit 421, a card reader control unit 422, a list holding unit 423, a command execution authorization holding unit 424, an authentication unit 425, a read/write unit 426, a card transfer unit 427 and a card lock mechanism 428 which are coupled together via a data bus 420.

The communication monitoring unit 421 is a communication module which sends and receives data to/from the ATM control unit 10 smoothly, transfers the received data to the card reader control unit 422, and sends data which is transferred from the card reader control unit 422 to the ATM control unit 10. The communication monitoring unit 421 is coupled to the ATM control unit 10 via a communication interface 429 that conforms to the USB (Universal Serial Bus) standard or the TCP/IP (Transmission Control Protocol/Internet Protocol) standard or the like and sends and receives commands and command execution results to/from the ATM control unit 10 via the communication interface.

The card reader control unit 422 is a module which comprises a function for interpreting the commands received from the ATM control unit 10, which causes the command execution authorization holding unit 424, authentication unit 425, read/write unit 426, card transfer unit 427, and card lock mechanism 428 to operate independently or mutually according to the content of the commands, and which sends the results to the ATM control unit 10.

Note that the main commands that the card reader 412 receives from the ATM control unit 10 include a card capture command which is a command instructing the capture of the IC card 21 in the card reader 412, a card ejection command which is a command to instruct the ejection of the IC card 21 thus captured in the card reader 412, from the card reader 412, a card data read command to instruct the reading of information from the IC card 21 captured in the card reader 412, a card data write command instructing the writing of information to the IC card 21 captured in the card reader 412, an authentication command, described subsequently, a card lock command instructing locking to prevent the IC card 21 captured in the card reader 412 from being ejected from the card reader 412, and a card lock cancellation command instructing the cancellation of the lock and the ejection of the IC card 21 from the card reader 412, and the like.

The list holding unit 423 is configured from a semiconductor memory, for example, and is used to hold a command authorization association list 430, described subsequently. Furthermore, the command execution authorization holding unit 424 is configured from a semiconductor memory and is used to hold command execution authorization of the card reader 412, described subsequently.

Here, 'command execution authorization' means authorization to execute a command that is supplied from the ATM control unit 10. In the case of this embodiment, two or more levels of authorization such as 'normal authorization,' and 'special authorization' and the like are prepared as types of command execution authorization. 'Normal authorization' is authorization which enables execution only of low-security, generic commands among the commands from the ATM control unit 10 and 'special authorization' is authorization which enables execution of a high-security command (hereinafter called a 'privilege command') in addition to these generic commands, among the commands from the ATM control unit 10.

In this embodiment, authorization for executing all of the commands supplied from the ATM control unit 10 to the card reader 412 is preset and a command authorization association list 430 which associates each command with authorization for executing the command is prestored in the list holding unit 423.

Furthermore, when executing a command which is supplied from the ATM control unit 10, the card reader control unit 422 acquires the command execution authorization which is associated with the command from the command authorization association list 430. The card reader control unit 422 then compares the acquired command execution authorization with the command execution authorization which is held in the command execution authorization holding unit 424 and supplied to the card reader 412 at the time, and when a command execution authorization enabling execution of the command is held by the card reader 412, same executes the command.

Note that, in this embodiment, the command execution authorization holding unit 424 is configured from a non-volatile memory such as a RAM for holding data only when electrical power is applied. Furthermore, when the supply of power to the card reader 412 stops and the power supply to the card reader 412 is subsequently turned back on, the command execution authorization 'normal authorization' is forcibly written to the command execution authorization holding unit 424 irrespective of the command execution authorization that was hitherto held by the command execution authorization holding unit 424. Thus, a privilege command cannot be executed immediately after the power is turned back on, thereby enabling increased security.

The authentication unit 425 performs authentication processing which is triggered upon receiving an authentication command from the ATM control unit 10. For this 'authentication,' online mutual authentication between the authentication unit 425 and the accounting host computer 3 (FIG. 12) or offline authentication via a one-time password which is issued by a security token, or the like, have been considered. Note that although there are no particular limits on each of the methods used for the online mutual authentication and the offline authentication, the challenge-response authentication and time synchronization authentication methods can be used as representative examples.

When this authentication has been performed normally, the card reader control unit 422 changes the command execution authorization held by the command execution authorization holding unit 424 from 'normal authorization to 'special authorization.' By changing the command execution authorization of the card reader 412 to 'special authorization,' the card reader 412 is able to execute high security commands.

Note that in this authentication step, although the ATM control unit 10 and communication processing unit 20 (FIG. 12) are involved in sending and receiving communication data, there is absolutely no need for their involvement when using authentication processing such as the aforementioned challenge-response authentication and one-touch password authentication.

The read/write unit 426 is a module which has a function for reading information from the IC card 21 that is captured in the card reader 412 (a data read) or writing information to the IC card 21 (a data write). Furthermore, the card transfer unit 427 is a module which has a function for capturing the IC card 21, inserted into a card insert slot (not shown) provided in the front portion of the ATM 411 (FIG. 12), in the card reader 412, or ejecting the IC card 21 captured in the card reader 412 to the outside via the card insert slot.

The card lock mechanism 428 is a mechanism which enables the card reader 412 to capture or eject the IC card 21 or, when any abnormality is detected during processing of the IC card 21 such as a data read or data write from/to the IC card 21, to lock the IC card 21 in a state of being captured in the card reader 412 and render it difficult to remove the IC card 21 by means of tweezers or pliers or other physical means.

In recent years, cases where criminals maliciously tamper with a card reader to produce a card jam have become a frequent concern. When a user inserts a card into the card reader that has been tampered with, the card jams in the card reader and the card can then no longer be returned even when the user performs a return operation on the ATM. Then, after the user gives up on their card being returned and has left, the criminal obtains the card illegally by means of the aforementioned physical means. This mechanism is installed in order to prevent this kind of concern.

Note that after this mechanism has locked the IC card 21 and the lock is subsequently canceled, the card reader 412 does not act autonomously and, rather, operates as a result of receiving a card lock cancellation command from the ATM control unit 10. Crimes have been on the rise in recent years and there has been an increased trend toward crimes in which profits are obtained illegally such as a case where the ATM control unit 10 is infected by malware and a command is sent unintentionally to each module of the ATM, thereby inducing an erroneous operation and an unauthorized cash withdrawal or the like. This trend suggests that a new concern has arisen whereby, even when an attempt is made to prevent a criminal from illegally obtaining the IC card 21 by locking the IC card 21 in the card reader 412 by means of the card lock mechanism 428, the locking of the IC card 21 is cancelled as a result of the criminal illegally sending a card lock cancellation command to the card reader 412 by infecting the ATM control unit 10 with malware.

This embodiment is one means for preventing this new kind of concern from arising and, by associating a special authorization with the card lock cancellation command in the command authorization association list 430, unless the above authentication processing is performed, even when an unauthorized card lock cancellation command is received, execution of this command can be prevented, and security can be maintained.

Figure 14:
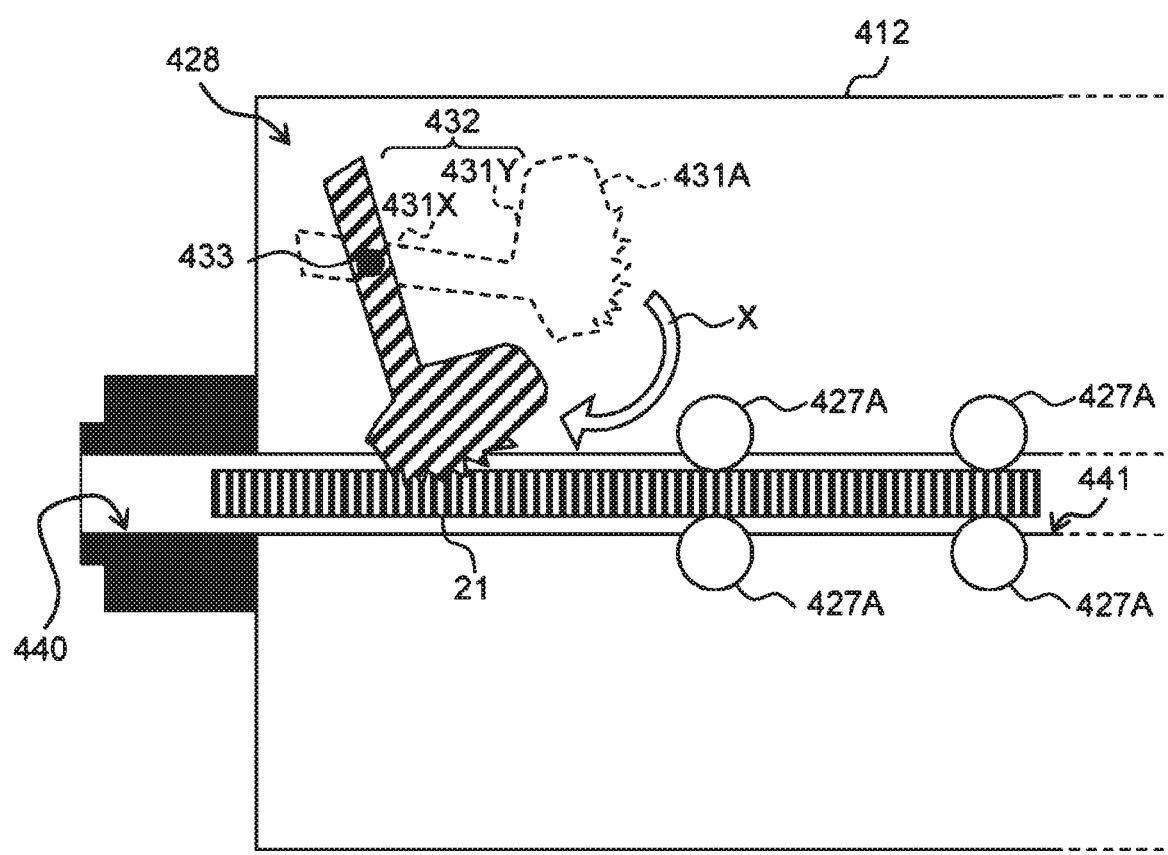
FIG. 14 is a block diagram showing a configuration example of a card lock function.

FIG. 14 shows a schematic configuration of the card lock mechanism 428. The card reader 412 comprises a card insert slot 440 which is disposed in the front of the ATM 411 (FIG. 12), and the IC card 21 is inserted or ejected via the card insert slot 440. The inserted or ejected IC card 21 is transferred along a card transfer path 441 under the power of a rubber roller 427A which holds a power source such as a motor which constitutes the card transfer unit 427 (FIG. 13)

The card lock mechanism 428 is configured by comprising a movable portion 432 which is configured from an arm portion 431X and an engagement portion 431Y which is formed integrally on one end of the arm portion 431X. The movable portion 432 is configured so as to be capable of being rotationally driven in the lock direction or in the opposite lock cancellation direction indicated by the arrow x from a standby position as indicated by the broken line in FIG. 14 by means of an actuator such as a motor or solenoid (not shown) and with a position a short way from the center of the arm portion 431X in a longitudinal direction thereof toward the other end serving as a fulcrum 433.

As the material of the movable portion 432, a general-purpose material that is used for the IC card 21, that is, a material that is reasonably hard enough in comparison with the hardness of plastic and the like, that is, steel or the like, is used. A plurality of sharp teeth 431A are provided on the tip of the engagement portion 431Y of the movable portion 432, and when the card lock mechanism 428 is operating and the movable portion 432 is rotationally driven from the standby position in the direction of the arrow x, the teeth 431A of the joining portion 431Y are made to mesh with the IC card 21, thereby locking the IC card 21 in the card reader 412.

When the IC card 21 which is captured in the card reader 412 is transferred to the card insert slot 440, an extremely high load is generated on the motor rotationally driving the rubber roller 427A of the card transfer unit 427, and when any transfer abnormality is detected such as when transfer slippage occurs, the card reader 412 issues a notification to the ATM control unit 10 to the effect that a transfer abnormality has occurred. The ATM control unit 10 which has received this notification then performs a status determination regarding whether a card lock is required, and upon determining that a lock is required, sends a card lock command to the card reader 412.

The card reader 412 which has received this card lock command operates the actuator which rotates the movable portion 432 of the card lock mechanism 428. Furthermore, when this actuator operates, the position of the movable portion 432 operates by rotating under great force from the standby position in the direction of the arrow x, and the teeth 431A of the engagement portion 431Y of the movable portion 432 mesh with the IC card 21. As a result, even when an attempt is subsequently made to remove the IC card 21 forcibly from the card reader 412, the meshing of the teeth 431A grows stronger and removal of the IC card 21 becomes difficult.

FIG. 15 shows a configuration example of a command authorization association list 430. FIG. 15 is an example of a case where three levels of command execution authorization, namely, 'normal authorization,' 'special authorization 1 (privilege 1),' and 'special authorization 2 (privilege 2)' have been prepared as command execution authorizations. In this example, 'special authorization 1 (privilege 1)' is a stronger authorization than 'normal authorization' and 'special authorization 2 (privilege 2)' is a stronger authorization than 'special authorization 1 (privilege 1).'

In the example of FIG. 15, for example, the configuration is such that the 'card insert command,' 'card eject command,' and 'data read command' are executable in cases where the card reader holds any command execution authorization among 'normal authorization,' 'privilege 1' and 'privilege 2,' whereas a 'data write command' is not executable using 'normal authorization,' but can be executed when 'privilege 1' or 'privilege 2' is held.

In principle, the design is such that the execution of low-security, generic commands is approved even when 'normal authorization' is held and, as the security of the commands increases, the execution of such commands is approved only when a stronger command execution authorization is held.

In the example of FIG. 15, the aforementioned card lock cancellation command is not executable when 'normal authorization' or 'privilege 1' is held and can only be executed when 'privilege 2' is held, and the card lock cancellation command is ranked as a high-security command.

The 'privilege 1 authentication command' and 'privilege 2 authentication command' are each commands for acquiring and holding special authorizations. These authentication commands accompany mutual authentication and one-time password authentication and the like as mentioned hereinabove and therefore this command execution authorization cannot be acquired and held without passing this authentication.

The configuration is such that the 'privilege 1 authentication command' itself is executable irrespective of which command execution authorization is held but the 'privilege 2 authentication command' is not executable when the authorization granted to the card reader is 'normal authorization' and can be executed when the authorization granted to the card reader is 'privilege 1.' That is, to acquire 'privilege 2' when 'normal authorization' is held, 'privilege 1' must first be acquired by executing the 'privilege 1 authentication command' and then 'privilege 2' must be acquired by executing the 'privilege 2 authentication command.'

As described above, by providing a plurality of levels of command execution authorization and suitably configuring the content of the command authorization association list 430, it is also possible to require two levels of authentication or the like to obtain a higher command execution authorization.

(3-2) Card Eject Command Execution Processing According to Third Embodiment

Figure 16:
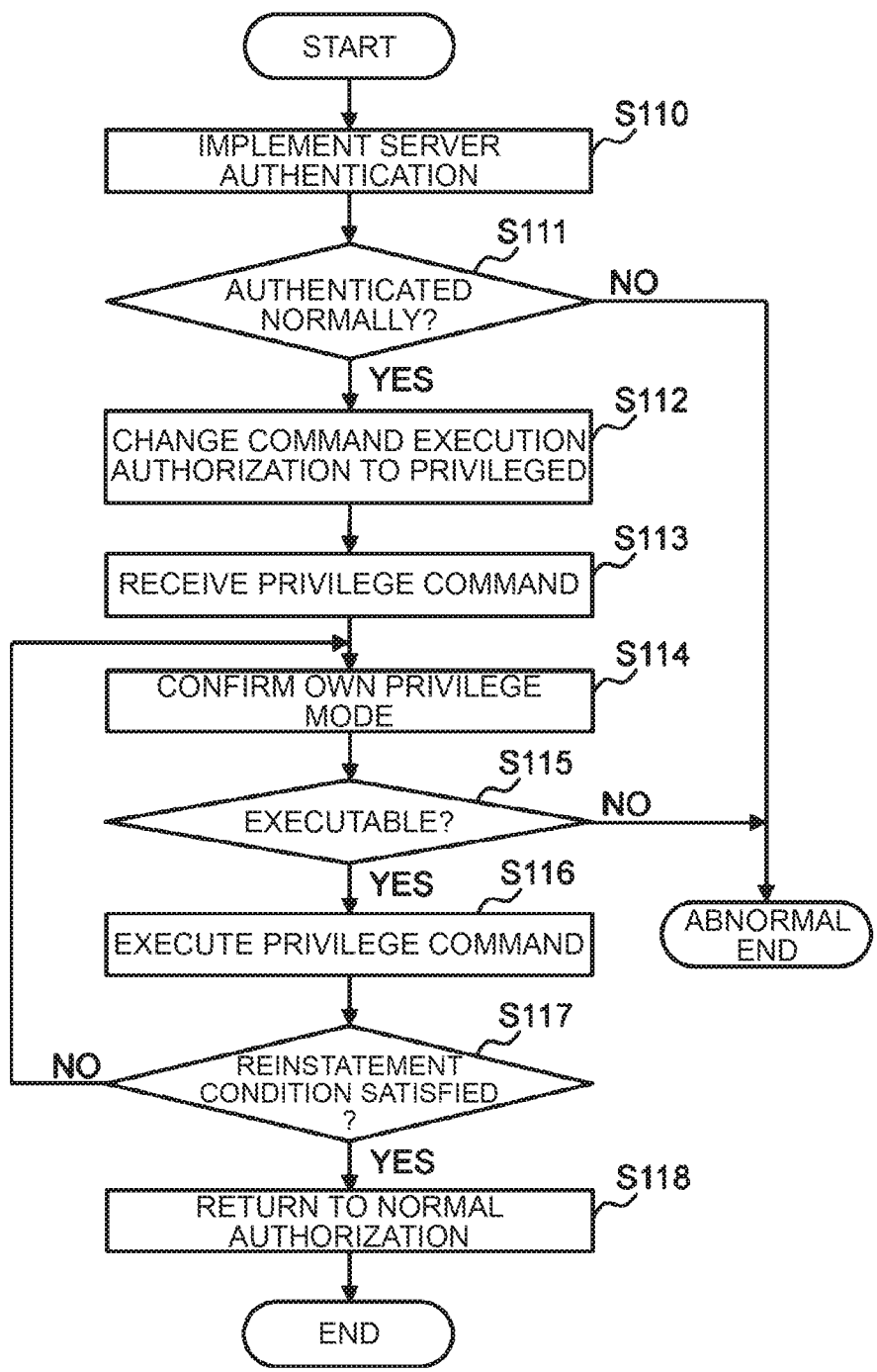
FIG. 16 is a flowchart showing the process steps of card eject command execution processing according to the third embodiment.

FIG. 16 shows the flow of serial processing (hereinafter referred to as card eject command execution processing) which is executed by the ATM 411 when the card reader 412 of the ATM 411 executes a card eject command, in the automatic transaction system 410 (FIG. 12) according to this embodiment.

As a situation where this card eject command execution processing is performed, a situation is assumed where the IC card 21 is jammed in the card reader 412 and has been locked by means of the card lock mechanism 428, and hence the user contacts a call center to relay this fact and a maintenance worker who has been thus informed arrives at the ATM (hereinafter called the target ATM) 411 where the IC card 21 is jammed and attempts to remove the IC card 21.

Furthermore, the card eject command execution processing is started in response to a mutual authentication request being sent from the accounting host computer 3 to the target ATM 411, the ATM control unit 10 of the target ATM 411 which receives the mutual authentication request sending an authentication request command to the card reader 412, and this authentication request command being received by the communication monitoring unit 421 (FIG. 13) of the card reader 412.

Note that the act of first sending a mutual authentication request from the accounting host computer 3 to the ATM 411 serves to perform maintenance on the card reader 412 of the target ATM 411 to provide authentication to enable execution of the privilege command by the card reader 412. Here, the ATM serving as the target (target ATM) 411 is specified by the communication from the user and therefore the accounting host computer 3 sends an authentication request only to the ATM (target ATM) 411. In other words, ATMs 411 not requiring maintenance are not made to execute a privilege command in order to prevent crime.

Furthermore, the communication monitoring unit 421 of the card reader 412 of the target ATM 411 which has received the mutual authentication command transfers the received mutual authentication command to the authentication unit 425 and the authentication unit 425 which has received the mutual authentication command performs mutual authentication with the accounting host computer 3 (S110).

The authentication unit 425 then determines whether this mutual authentication has been performed normally (S111) and when the mutual authentication has not been performed normally (S111: NO), ends the card eject command execution processing. Therefore, in the foregoing case, because the maintenance worker is unable to remove the IC card 21 from the card reader 412, measures are then taken such as resending the mutual authentication request from the accounting host computer 3 to the target ATM 411.

However, when this mutual authentication has been performed normally (S111: YES), the card reader control unit 422 of the card reader 412 changes the command execution authorization held by the command execution authorization holding unit 424 to 'special authorization' (S112).

Thereafter, the maintenance worker causes the card lock cancellation command to be sent from the ATM control unit 10 of the target ATM 411 to the card reader 412 by means of a maintenance operation.

Upon receiving this card lock cancellation command (S113), the communication monitoring unit 421 of the card reader 412 then transfers the card lock cancellation command to the card reader control unit 422. Furthermore, upon receiving the card lock cancellation command, the card reader control unit 422 confirms the command execution authorization supplied to its own card reader 412 held in the command execution authorization holding unit 424 (S114) and determines whether the command execution authorization supplied to its own card reader 412 is an authorization which enables execution of the card lock cancellation command (S115).

Furthermore, when the command execution authorization held by the command execution authorization holding unit 424 is not an authorization that enables execution of the card lock cancellation command (S115: NO), the card reader control unit 422 ends the card eject command execution processing without executing the card lock cancellation command.

However, when the command execution authorization held by the command execution authorization holding unit 424 is an authorization that enables execution of the card lock cancellation command (S115: YES), the card reader control unit 422 operates the card lock mechanism 428 to cancel the lock on the IC card 21 (S116). Thus, in the foregoing case, the maintenance worker performs work to remove the IC card 21 by means of physical means such as tweezers.

The card reader control unit 422 then determines whether a condition for returning the command execution authorization to a normal authorization has been established (S117). There are no particular restrictions on the 'condition' in this embodiment but a rational condition with a finite period or number of times a privilege command is executable can be applied such as, for example, a condition where the privilege command has been executed a fixed number of times or where a fixed period has elapsed since the special authorization has been held.

Furthermore, when it is determined that the condition for restoring the command execution authorization to normal authorization has not been satisfied (S117: NO), the card reader control unit 422 returns to step S114 and then repeats the processing of steps S114 to S117 until this condition is satisfied.

However, when the condition for restoring the command execution authorization to normal authorization has been satisfied (S117: YES), the card reader control unit 422 changes the command execution authorization held by the command execution authorization holding unit 424 to 'normal authorization' (S118) and then the card eject command execution processing ends.

After the command execution authorization has been changed to 'normal authorization,' the privilege command cannot be executed unless mutual authentication is performed once again with the accounting host computer 3, and therefore the privilege command execution count and execution period can be made finite and security can be increased.

(3-3) Operation and Effects of this Embodiment

As described hereinabove, in the automatic transaction system 410 according to this embodiment, special authorization is associated with the card lock cancellation command and authentication processing is executed in the card reader 412 according to a mutual authentication request from the accounting host computer 3, and the card reader 412 changes its own authorization to special authorization to enable execution of the card lock cancellation command only when authentication has succeeded.

Therefore, according to this embodiment, it is possible to realize a highly reliable automatic transaction system in which, even when the ATM control unit 10 is infected with malware and an unauthorized card lock cancellation command has been sent to the card reader 412, the card reader 412 can be prevented from executing the unauthorized card lock cancellation command.

Figure 17:
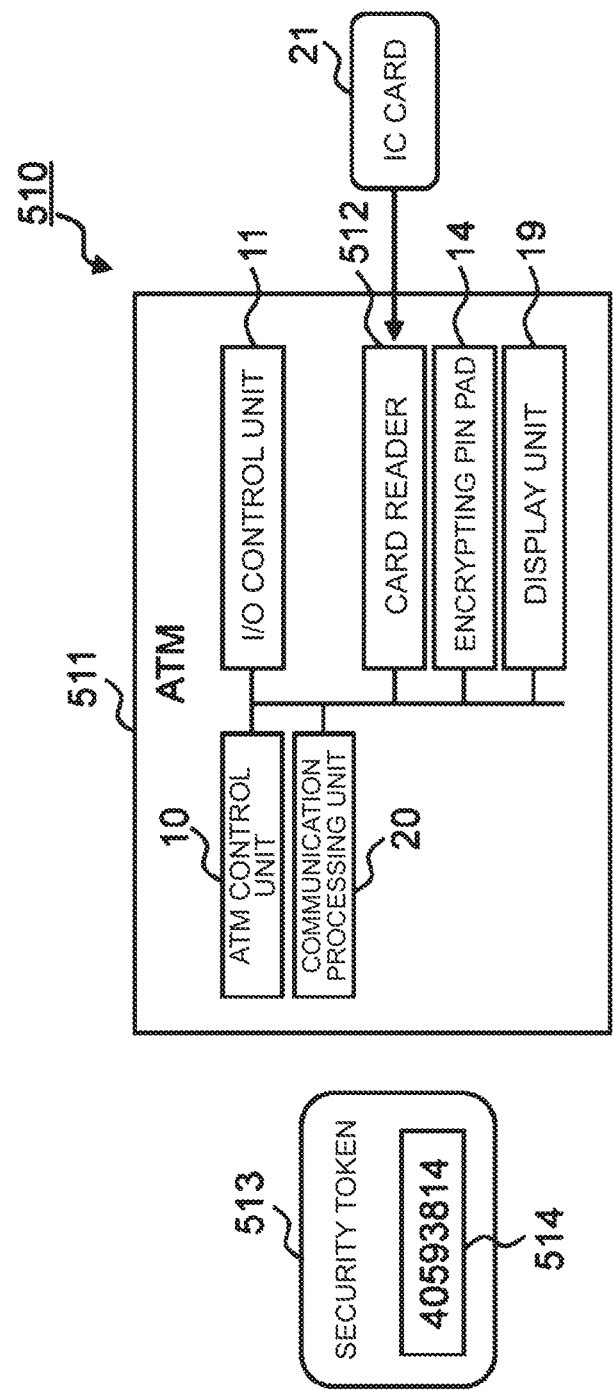
FIG. 17 is a block diagram showing an overall configuration example of an automatic transaction system according to a fourth embodiment.

(4) Fourth Embodiment (4-1) Configuration of Automatic Transaction System According to this Embodiment FIG. 17, in which the same reference signs are shown assigned to parts corresponding to parts in FIG. 12, shows an automatic transaction system 510 according to a fourth embodiment. Note that although, for the sake of a clear explanation, the paper currency processing unit 12, receipt printer 15, passbook printer 16, journal printer 17, and monitoring camera 18 which were explained in FIG. 1 have been omitted from FIG. 17, it goes without saying that the ATM 511 of this embodiment also comprises these modules.

In the third embodiment described hereinabove, in order to execute the privilege command, the card reader 412 of the target ATM 411 must first perform mutual authentication with the accounting host computer 3 and for this reason the target ATM 411 must be coupled to the accounting host computer 3 via the network 4 or the like as per FIG. 12.

However, in the automatic transaction system 510 according to this embodiment, in the maintenance carried out when the user's IC card 21 has been locked in the card reader 512 of the target ATM 511, the target ATM 511 need not be coupled to the accounting host computer 3 and the target ATM 511 may be in a standalone state.

In this embodiment, the card reader 512 performs authentication by means of a security token 513 instead of the mutual authentication with the accounting host computer 3. That is, in this automatic transaction system 510, authentication is performed as a result of the maintenance worker using the encrypting pin pad 14 installed in the target ATM 511 to input a one-time password 514 generated from the security token 513 and of the authentication unit 425 of the card reader 512 determining whether the one-time password thus input is genuine.

Hence, in the automatic transaction system 510 according to the fourth embodiment, this embodiment can be applied even when a fault occurs in the accounting host computer 3 or network 4 and communication between the accounting host computer 3 and target ATM 511 is interrupted.

Note that security is ensured based on the premise that only the maintenance worker owns the security token 513 and that the maintenance worker takes sufficient care against loss and theft of the security token 513.

An explanation of the configuration of the card reader 512 according to this embodiment, which has the same configuration as the card reader 412 according to the third embodiment explained with reference to FIGS. 13 and 14, is omitted.

(4-2) Card Eject Command Execution Processing According to Fourth Embodiment

Figure 18:
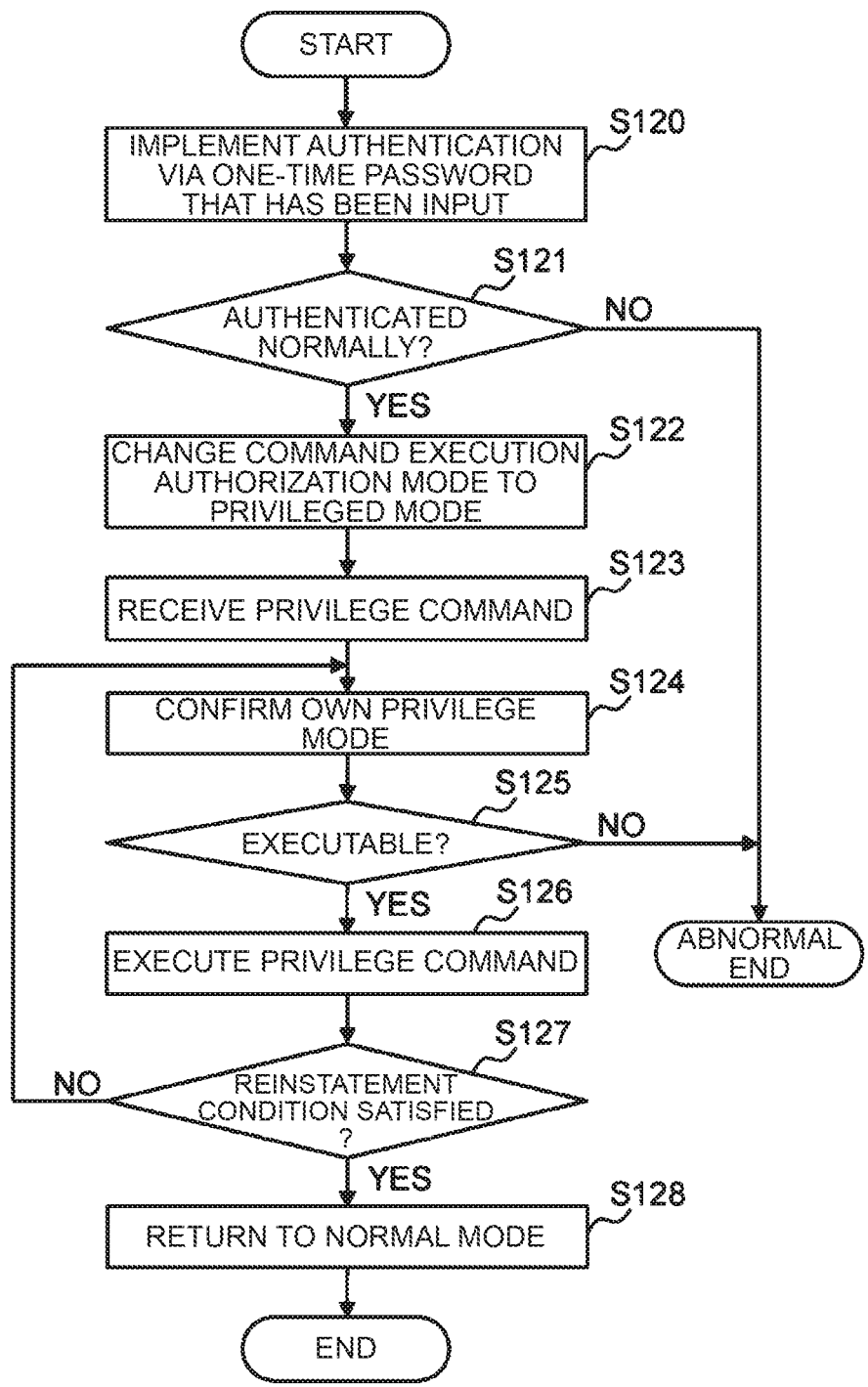
FIG. 18 is a flowchart showing the process steps of card eject command execution processing according to the fourth embodiment.

FIG. 18 shows the flow of serial processing (hereinafter referred to as card eject command execution processing) which is executed by the target ATM 511 when the card reader 512 of the target ATM 511 executes a card eject command, in the automatic transaction system 510 according to this embodiment.

As a situation where this card eject command execution processing is performed, as per the third embodiment, a situation is assumed where the IC card 21 is jammed in the card reader 512 and the IC card 21 has been locked by means of the card lock mechanism 428 (FIG. 13), and hence the user contacts a call center to relay this fact and a maintenance worker who has been thus informed arrives at the ATM 511 where the IC card 21 is jammed and attempts to remove the IC card 21.

Furthermore, this card eject command execution processing is started in response to the maintenance worker using the encrypting pin pad 14 (FIG. 17) installed in the target ATM 511 to input the one-time password 514 generated from the owned security token 513.

Note that the maintenance worker first inputs the one-time password 514 generated from the security token 513 to the target ATM 511 in order to perform maintenance on the card reader 512 of the target ATM 511 to provide authorization to enable execution of the privilege command by the card reader 512.

Furthermore, the one-time password 514 thus input by the maintenance worker by using the encrypting pin pad 14 is sent together with the mutual authentication command to the card reader 512 via the ATM control unit 10 of the target ATM 511. The communication monitoring unit 421 (FIG. 13) of the card reader 512 which has received the mutual authentication command and one-time password 514 transfers the received mutual authentication command and one-time password 514 to the authentication unit 425 (FIG. 13) and the authentication unit 425 which has received the mutual authentication command and one-time password 514 determines whether the one-time password 514 is genuine in co-operation with the card reader control unit 422 (S120).

Further, upon determining that the one-time password 514 thus input is not genuine (S121: NO), the authentication unit 425 ends the card eject command execution processing. Therefore, in the foregoing case, because the IC card 21 cannot be removed from the card reader 512, measures are then taken such as re-inputting the one-time password 514.

However, when it is determined that the one-time password 514 is genuine (S121: YES), steps S122 to S128 which are similar to steps S112 to S118 of the card eject command execution processing of the third embodiment described hereinabove with reference to FIG. 16 are executed in the card reader 512 and the card eject command execution processing then ends.

Note that after the command execution authorization of the card reader 512 of the target ATM 511 has been changed to 'normal authorization' in step S128, the privilege command cannot be executed unless authentication by means of the security token 513 (FIG. 17) is performed once again, and therefore the privilege command execution count and execution period can be made finite and security can be increased.

(4-3) Operation and Effects of this Embodiment

As described hereinabove, in the automatic transaction system 510 according to this embodiment, special authorization is associated with the card lock cancellation command and authentication processing using the security token 513 is executed in the card reader 512, and the card reader 512 changes its own authorization to special authorization to enable execution of the card lock cancellation command only when authentication has succeeded.

Therefore, according to this embodiment, it is possible to realize a highly reliable automatic transaction system in which, even when the ATM control unit 10 is infected with malware and an unauthorized card lock cancellation command has been sent to the card reader 512, the card reader 512 can be prevented from executing the unauthorized card lock cancellation command.

(5) Fifth Embodiment (5-1) Configuration of a Conventional Thin Client Automatic Transaction System To explain the thin client automatic transaction system according to this embodiment, the configuration of a conventional thin client automatic transaction system will first be explained.

Note that a thin client automatic transaction system denotes an automatic transaction system which executes the minimum processing required by an automatic transaction apparatus (hereinafter called a thin client ATM) which is the client terminal used by the user and which concentrates most of the processing on the server side (hereinafter called a thin client server). Each thin client ATM is capable of communicating with another thin client ATM in the business store via a thin client server without passing via an in-company host computer (hereinafter called an in-company host).

Figure 19:
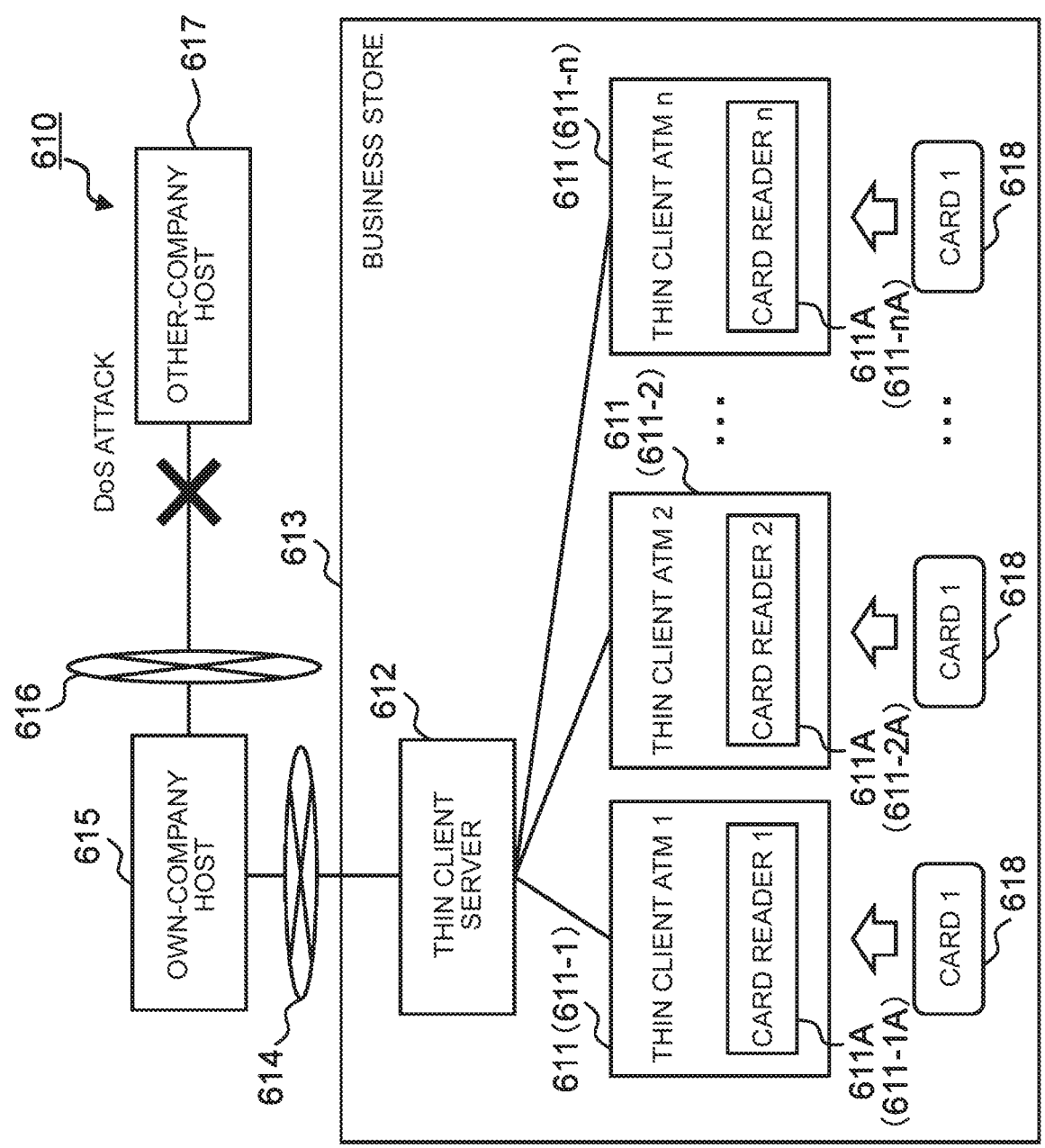
FIG. 19 is a block diagram showing a configuration example of a conventional thin client automatic transaction system.

FIG. 19 shows a configuration example of a conventional thin client automatic transaction system 610. In this thin client automatic transaction system 610, one or more thin client ATMs 611 and a thin client server 612 which is coupled to these thin client ATMs 611 are provided in one business store 613. Furthermore, the thin client server 612 is coupled to an in-company host 615 via a network 614 such as a LAN or WAN and the in-company host 615 is coupled to a host computer of another company (hereinafter called an other-company host) 617 via a network 616 such as a LAN or WAN.

Note that, in the ensuing explanation, when it is necessary to distinguish between individual thin client ATMs, different reference signs such as '611-1,' '611-2,' . . . '611-$n$' and so forth are each assigned to these thin client ATMs, and when there is no particular need to distinguish between individual thin client ATMs, the common reference sign '611' is assigned to these thin client ATMs. Likewise, when it is necessary to distinguish between the individual card readers installed in each of the thin client ATMs 611, different reference signs '611-1A,' '611-2A,' . . . '611-$n$A' and so forth are assigned to each of these card readers, and when there is no particular need to distinguish between individual card readers, the common reference sign '611A' is assigned to the card readers.

Figure 20:
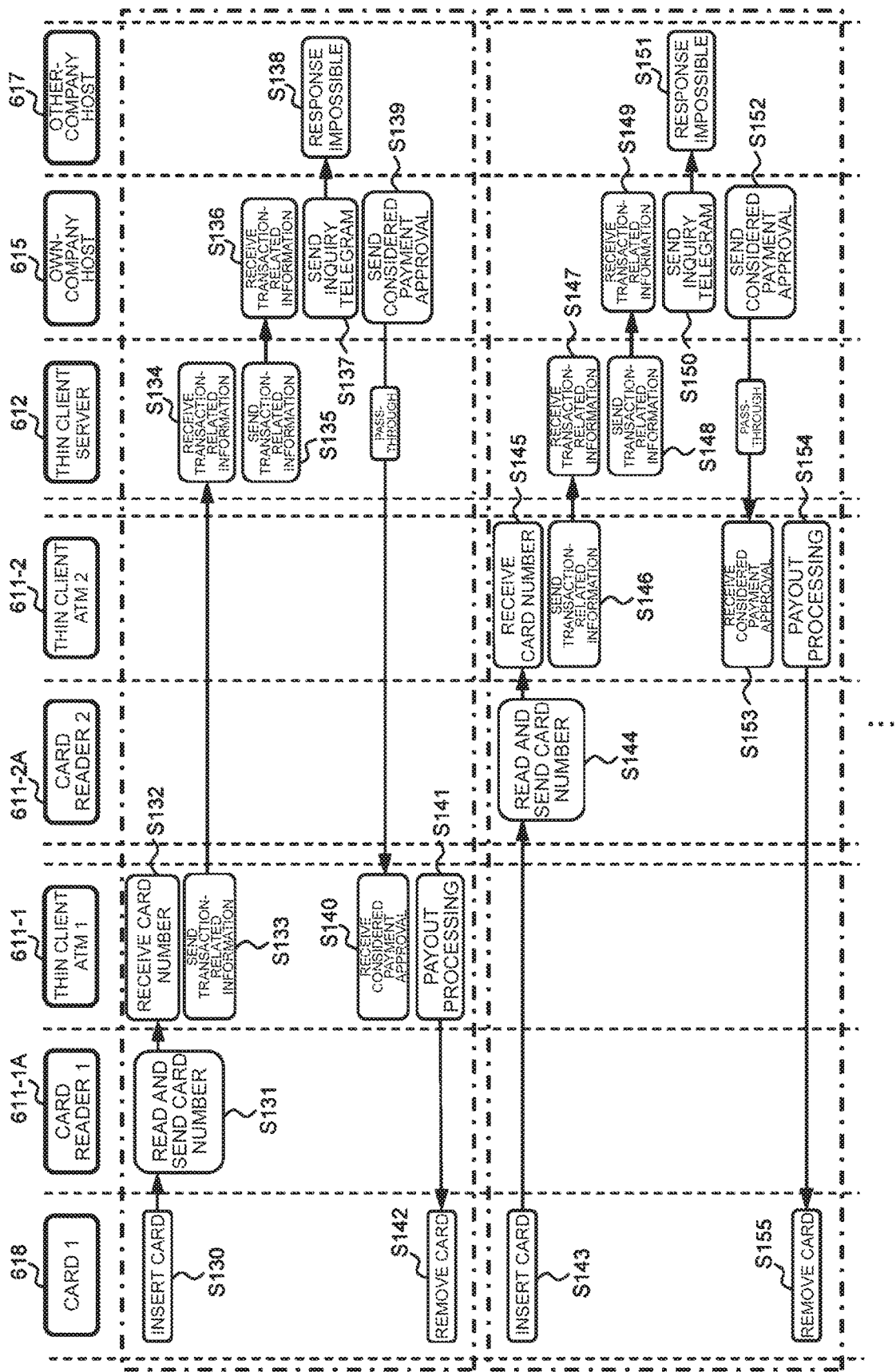
FIG. 20 is a sequence diagram showing the flow of a cash transaction in a conventional thin client automatic transaction system.

Next, an example of a cash transaction that is executed by a malicious user in this conventional thin client automatic transaction system 610 will be explained with reference to FIG. 20. Here, the user attempts to perform a cash transaction at a plurality of thin client ATMs 611 by using a card 618 such as a credit card of another company.

Furthermore, a state is assumed where a host computer of another company (other-company host 617) which issued this card 618 is not capable of communicating with the in-company host 615 after receiving a DoS attack (Denial of Service attack) from the user of the card 618 or an associate thereof. Note that a DoS attack is one technique for mounting an illegal attack to destroy the processing power of a communication line or server by sending a large volume of packets and data and the like to the server or the like subject to the attack, and to attack a vulnerability in a server application and render service provision difficult.

First, the user inserts the other-company card 618 in a card insert slot (not shown) that is provided in the front of the one thin client ATM 611-1 (S130). Here, a card reader 611-1A of the thin client ATM 611-1 reads information such as a card number which is recorded on the inserted card 618 and sends the information thus read to the ATM control unit (not shown) in the same thin client ATM 611 (S131).

Furthermore, upon reading the card number thus read by the card reader 611-1A (S132), the ATM control unit of the thin client ATM 611-1 acquires required information relating to the current transaction such as the transaction amount by causing the display unit to display the required operation screen, and so forth, and causes the communication processing unit (not shown) in the thin client ATM 611-1 to send the acquired information to the thin client server 612 as transaction-related information together with the card number received in step S132 (S133).

Upon receiving this transaction-related information (S134), the thin client server 612 processes the received transaction-related information and sends the processed transaction-related information to the in-company host 615 (S135).

Upon receiving this transaction-related information (S136), the in-company host 615 sends an inquiry telegram to the corresponding other-company host 617 based on the received transaction-related information (S137). However, at the time, the other-company host 617 is subjected to a DoS attack as mentioned earlier and hence becomes unresponsive, with this inquiry telegram not being processed (S138).

In a case of this kind of cash transaction with no response from the other-company host 617, the in-company host 615 normally sends approval of the cash transaction by considering same beforehand based on the transaction-related information sent from the thin client ATM 611 (hereinafter referred to as considered payment approval) to the thin client ATM 611-1 via the thin client server 612 (S139).

Furthermore, upon receiving this considered payment approval (S140), the thin client ATM 611-1 executes payout processing to pay out the transaction amount which has been requested by the user (S141). Note that here the maximum payment amount that can be paid out is up to the daily payment limit amount. Thereafter, the card 618 is ejected from the card reader 611-1A and returned to the user (S142).

Next, the user moves to another thin client ATM 611-2 which is located in the same or another business store 613 (FIG. 19) and inserts the card 618 that was used in steps S130 to S142 into the card insert slot of the thin client ATM 611-2 (S143).

As a result, the same processing as the processing described hereinabove for steps S131 to S133 is executed in the thin client ATM 611-2 and transaction-related information is sent to the thin client server 612 (S144 to S146) and, based on this transaction-related information, the same processing as the processing described hereinabove for steps S134 to S137 is executed in the thin client server 612 and in-company host 615, and an inquiry telegram is sent from the in-company host 615 to the other-company host 617 (S147 to S150).

However, at the time, the other-company host 617 is still being subjected to a DoS attack and hence becomes unresponsive, with this inquiry telegram not being processed by the other-company host 617 (S151). As a result, similarly to step S139, the in-company host 615 sends considered payment approval to the thin client ATM 611-2 via the thin client server 612 (S152).

Thus, upon receiving this considered payment approval (S153), the thin client ATM 611-2 executes payout processing to pay out the transaction amount which has been requested by the user as per step S141 (S154). Further, the thin client ATM 611-2 then returns the card 618 to the user (S155).

A malicious user repeats the same steps while moving sequentially from one thin client ATM 611 to another thin client ATM 611. As a result, extensive damage occurs.

(5-2) Automatic Transaction System According to this Embodiment

The thin client automatic transaction system according to this embodiment, which is constructed by considering the aforementioned problems with the conventional thin client automatic transaction system, will be explained next.

Figure 21:
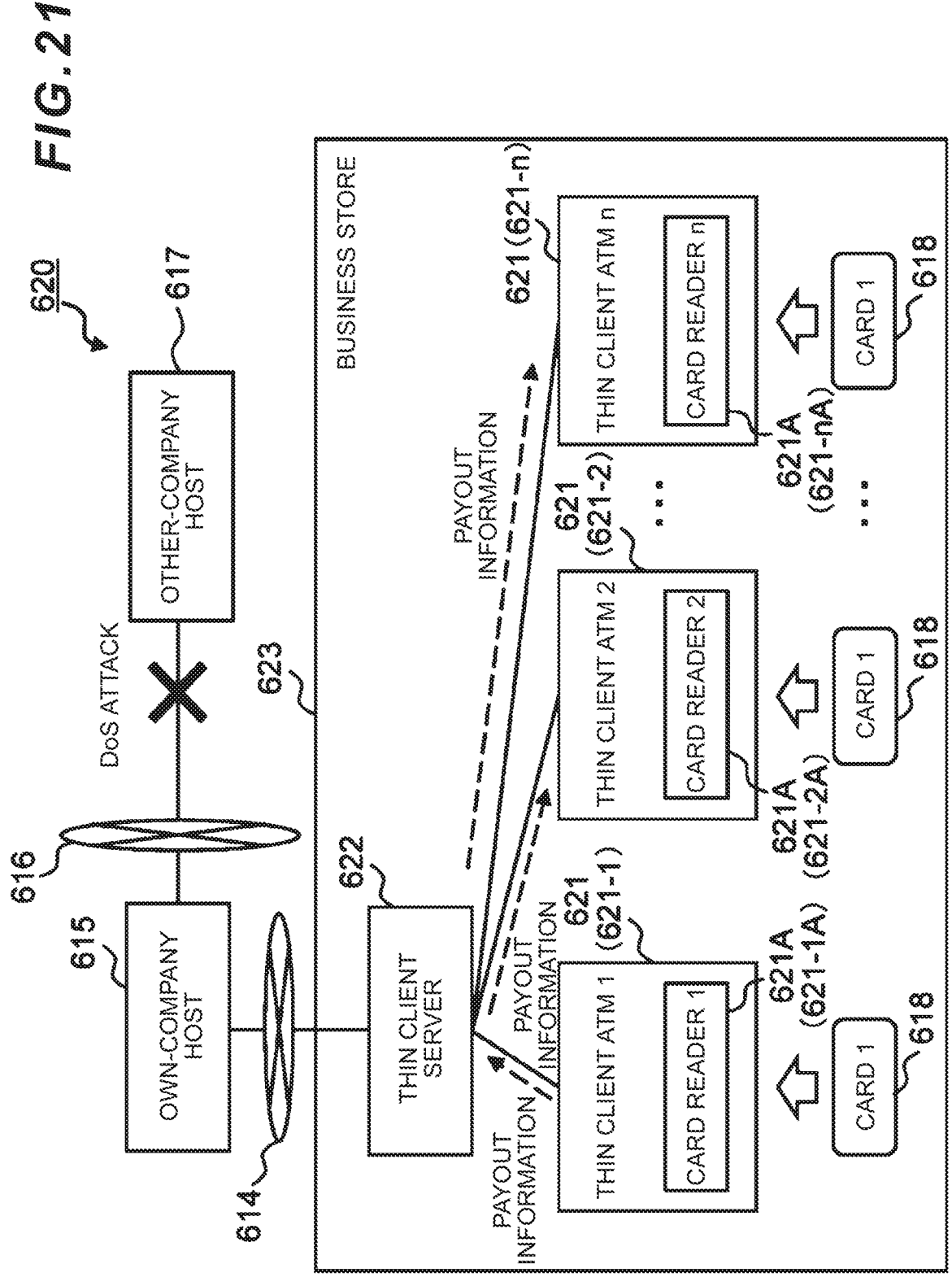
FIG. 21 is a block diagram showing a configuration example of a thin client automatic transaction system according to a fifth embodiment.

FIG. 21, in which the same reference signs are assigned to parts corresponding to parts in FIG. 19, shows a schematic configuration of a thin client automatic transaction system 620 according to this embodiment. In this thin client automatic transaction system 620, one or more thin client ATMs 621 and a thin client server 622 which is coupled to these thin client ATMs 621 are provided in one business store 623. Furthermore, the thin client server 622 is coupled to an in-company host 615 via a network 614 and the in-company host 615 is coupled to an other-company host 617 via a network 616.

Note that, in the ensuing explanation, when it is necessary to distinguish between individual thin client ATMs, different reference signs such as '621-1,' '621-2,' . . . '621-n' and so forth are each assigned to these thin client ATMs, and when there is no particular need to distinguish between individual thin client ATMs, the common reference sign '621' is assigned to these thin client ATMs. Likewise, when it is necessary to distinguish between the individual card readers installed in each of the thin client ATMs 621, different reference signs '621-1A,' '621-2A,' . . . '621-nA' and so forth are assigned to each of these card readers, and when there is no particular need to distinguish between individual card readers, the common reference sign '621A' is assigned to the card readers.

Figure 22:
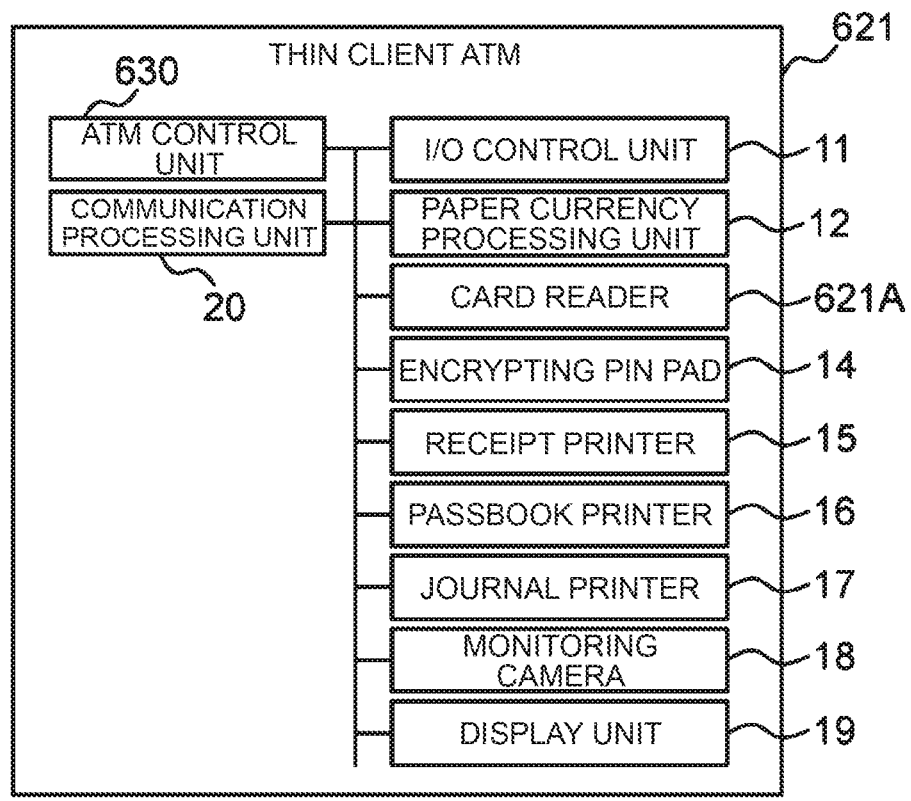
FIG. 22 is a block diagram showing a configuration example of a thin client ATM.

As shown in FIG. 22 in which the same reference signs are assigned to parts corresponding to parts in FIG. 1, the thin client ATM 621 has a similar hardware configuration to the ATM 2 of the first embodiment described hereinabove with reference to FIG. 1. However, this embodiment differs from the ATM 2 according to the first embodiment in that the ATM control unit 630 only performs the minimal operational control required by the thin client ATM 621.

Figure 23:
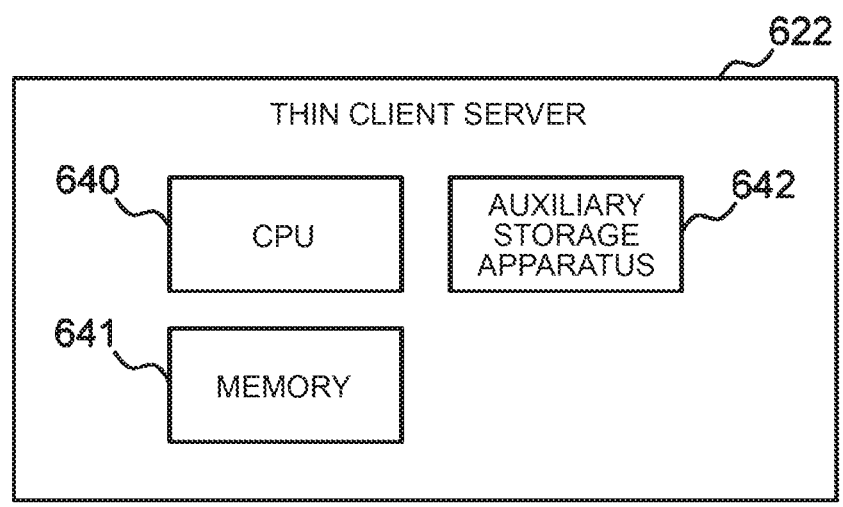
FIG. 23 is a block diagram showing a configuration example of a thin client server.

Moreover, as shown in FIG. 23, the thin client server 622 is an all-purpose server apparatus which comprises information processing resources such as a CPU 640, memory 641, and auxiliary storage apparatus 642. The CPU 640 is a processor which is tasked with controlling the overall operation of the thin client server 622, and the memory 641 is configured from a semiconductor memory and is used as the working memory of the CPU 640.

The auxiliary storage apparatus 642 is, for example, configured from a high-capacity, nonvolatile storage medium such as a hard disk apparatus or SSD (Solid State Drive) and is used to hold various programs and data and the like for long periods. Various processing, described subsequently, of the whole thin client server 622 is executed by reading programs of the thin client server 622 that are required at startup and where necessary from the auxiliary storage apparatus 642 to the memory 641 and executing the programs thus read by means of a CPU 640.

Here, the principal difference between the thin client automatic transaction system 620 (FIG. 21) according to this embodiment and the conventional thin client automatic transaction system 610 described hereinabove with reference to FIG. 19 lies in the fact that the card reader 621A installed in the thin client ATM 621 of this embodiment holds a database shown in FIG. 24 (hereinafter called a card information database) 650 and determines for itself the feasibility of a cash transaction based on the card information database 650.

In reality, registered in the card information database 650 are the card numbers of the cards 618 of each of the users who have performed a cash transaction in the thin client automatic transaction system 620 thus far, an upper limit payment amount for cash transactions that has been preconfigured for each of the cards 618 (hereinafter called the payment limit amount), and a total amount paid in cash transactions up to the present moment for each of the cards 618 (hereinafter called the current paid amount). Note that here the card reader 621A stores each of the uniform payment limit amounts of each card issuing company which have been preset and are not user-dependent. However, the payment limit amounts for each of the cards 618 may be recorded on each of the cards 618.

Furthermore, when a user has inserted the card 618 and performed an operation requesting a cash transaction, the card reader 621A refers to the card information database 650 to determine whether the current paid amount exceeds the payment limit amount configured for the card 618 when the cash transaction has been performed, and after executing the cash transaction when the current paid amount is equal to or smaller than the payment limit amount, notifies the thin client server 622 of the transaction result as payout information.

Moreover, when supplied with this notification, the thin client server 622 sends this payout information to each of the thin client ATMs 621 other than this thin client ATM 621. Furthermore, when this payout information is supplied, the card reader 621A of each thin client ATM 621 updates the current paid amount of the user in the card information database 650 based on this payout information.

However, the card reader 621A returns the card 618 to the user without executing the cash transaction when the current paid amount for the user when the cash transaction is performed exceeds the payment limit amount set for the card 618. As a result, according to this thin client automatic transaction system 620, a cash transaction which exceeds the payment limit amount configured for each of the cards 618 cannot be performed and it is possible to prevent the damage caused by cash fraud by a malicious user from becoming extensive.

Figure 25:
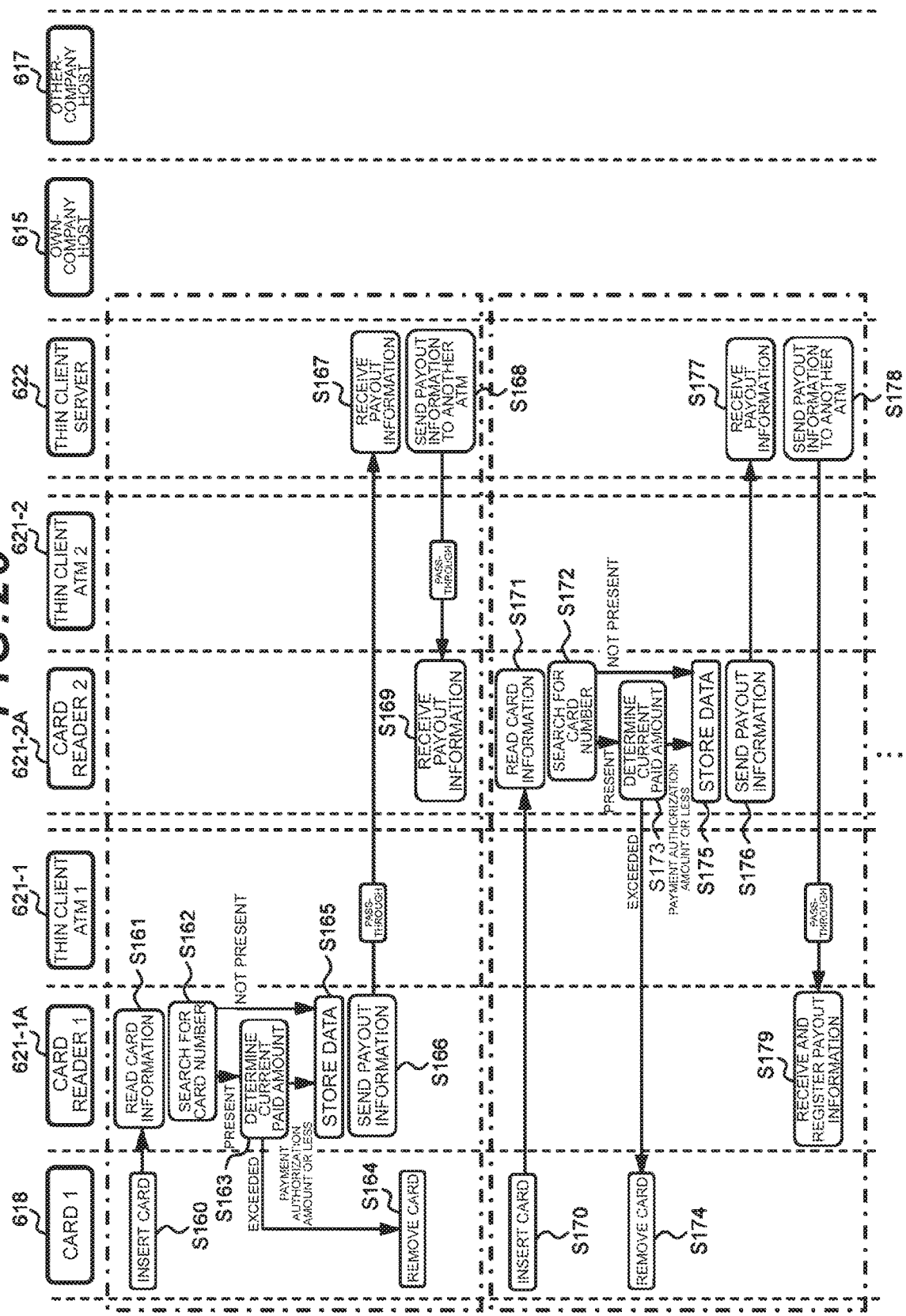
FIG. 25 is a sequence diagram showing the flow of a cash transaction in the thin client automatic transaction system of the fifth embodiment.

FIG. 25 shows the flow of processing in the thin client automatic transaction system according to this embodiment which possesses this kind of function when a malicious user attempts the cash fraud described hereinabove with reference to FIG. 19. Note that, in FIG. 25, in order to avoid complexity in the diagram, the flow of serial processing relating to payout processing which is executed when a cash transaction is performed normally in the thin client ATM 621 is omitted.

First, the user inserts the other-company card 618 in a card insert slot (not shown) that is provided in the front of the thin client ATM 621-1 (S160). Here, the card reader 621-1A of the thin client ATM 621-1 reads the card information such as the card number that is recorded on the inserted card 618 and sends the card information thus read to the ATM control unit 630 (FIG. 22) in the same thin client ATM 621 (S161). Furthermore, upon receiving the card number thus read by the card reader 621-1A, the ATM control unit 630 of the thin client ATM 621-1 acquires required information relating to the current cash transaction such as the transaction amount by causing the display unit to display the required operation screen, and so forth.

Furthermore, the card reader 621-1A searches the card information database 650 which the card reader 621-1A holds for the card number read from the card 618 in step S161 (S162).

In addition, when the card number of the user's card 618 is detected as a result of this search, the card reader 621-1A refers to the card information database 650, compares the current paid amount for the card 618 with the payment limit amount configured for the card 618, and determines whether the current paid amount exceeds the payment limit amount when the transaction amount currently requested has been paid (S163).

Furthermore, in cases where it is determined in step S163 that the current paid amount for the card when the currently requested transaction amount has been paid exceeds the payment limit amount of the card 618, the card reader 621-1A returns the card 618 to the user without performing the cash transaction (S164) and then ends the processing.

However, in cases where the card number of the card 618 inserted at the time has not been detected in the card information database 650 in the search of step S162, or in cases where it is determined in step S163 that the current paid amount of the card 618 is still equal to or smaller than the payment limit amount of the card 618 even when the currently requested transaction amount is paid, the card reader 621-1A registers information such as the card number and payment limit amount of the card 618 in the card information database 650 (S165).

Moreover, the card reader 621-1A subsequently adds and registers the card number and payment limit amount of the card 618 to the card information database 650, and registers the transaction amount requested at this time in the card information database 650 as the current paid amount in association with this card number and payment limit amount (S165). Furthermore, the card reader 621-1A subsequently encrypts the card number, payment limit amount and current paid amount of the user before sending same to the thin client server 622 as the payout information (S166).

Upon receiving the payout information from the thin client server 621-1 (S167), the thin client server 622 sends this payout information to each of the card readers 621-2A to 621-nA of the other thin client ATMs 621-2 to 621-n in the same business store (S168). Moreover, the card readers 621-2A to 621-nA of the thin client ATMs 621-2 to 621-n which have received this payout information each decode the payout information and register the payout information in the card information database 650 which the card readers each hold (S169).

Next, the user moves to another thin client ATM 621-2 which is located in the same business store 623 (FIG. 21) and inserts the card 618 that was used in steps S160 to S169 into the card insert slot of the thin client ATM 621-2 (S170).

As a result, the same processing as the processing described hereinabove for steps S160 to S166 is executed in the card reader 621-2A of the thin client ATM 621-2 and the payout information is sent to the thin client server 622 (S170 to S176).

Upon receiving the payout information (S177), the thin client server 622 sends this payout information to each of the card readers 621-1A and 621-2A to 621-nA of the other thin client ATMs 621-1 and 621-2 to 621-n in the same business store 623 (S178). Moreover, the card readers 621-1A and 621-2A to 621-nA of the thin client ATMs 621-1 and 621-2 to 621-n which have received this payout information each register the payout information in the card information database 650 which the card readers each hold (S179).

Furthermore, thereafter, the processing of the aforementioned steps S160 to S169 and S170 to S179 is repeated each time the user inserts the card 618 into the thin client ATM 621 in the business store. Therefore, it is possible to prevent preemptively an amount of money that is equal to or larger than the payment limit amount which has been configured for the card 618 from being paid even when a malicious user uses the same card 618 to commit cash fraud.

Note that, as mentioned hereinabove, in FIG. 25, in order to avoid complexity in the diagram, the flow of serial processing relating to payout processing which is executed when a cash transaction is performed normally in the thin client ATM 621 is omitted, but in a real cash transaction, the processing of steps S162 to S169 and S172 to S179 in FIG. 25 may be executed in the thin client automatic transaction system 610 after the thin client ATM 611 has received considered payment approval from the in-company host 615 in step S140 or S153 in FIG. 20.

In the foregoing case, when a determination that the current paid amount is equal to or smaller than the payment limit amount even when the currently requested transaction amount has been paid is obtained in step S163 or step S173 in FIG. 25, card return may be performed after paying out the amount requested by the thin client ATM 611 in conjunction with the addition and registration of the required information in the card information database 650 in step S165 or step S175.

(5-3) Operation and Effects of this Embodiment

As described hereinabove, in the thin client automatic transaction system 620 according to this embodiment, for each card 618 that has performed a cash transaction, the payment limit amount and current paid amount are managed by being registered in the card information database 650 in the card reader 621A of each thin client ATM 621.

Furthermore, when a cash transaction is performed in each thin client ATM 621, it is determined in the card reader 621A whether the current paid amount exceeds the payment limit amount when the currently requested transaction amount has been paid, and the transaction is suspended when an affirmative result is obtained, whereas if a negative result is obtained, the card number, payment limit amount and current paid amount of the card 618 used at this time are transferred as payout information to the other thin client ATMs 621 via the thin client server 622, and the card readers 621A of the other thin client ATMs 621 update the card information database 650 which same manage based on this payout information.

Accordingly, according to this thin client automatic transaction system 620, information on a cash transaction which has been executed in one thin client ATM 621 can be shared with other thin client ATMs 621, and it is possible to preemptively suppress payout of a payment equal to or larger than the payment limit amount configured for the card 618 in a cash transaction for which the same card 618 is used even when the thin client ATM 621 targeted for the transaction is changed. Thus, according to this embodiment, it is possible to realize a highly reliable thin client automatic transaction system which reliably suppresses extensive damage caused by cash fraud using the same card 618.

(6) Other Embodiments

Note that, in the aforementioned fifth embodiment, a case was described where the automatic transaction systems 110, 310, 410 and 510 according to the first to fourth embodiments and the thin client automatic transaction system 620 according to the fifth embodiment each only have a configuration and functions which pertain to each of these embodiments, but the present invention is not limited to or by same, rather, the automatic transaction systems 310, 410 and 510 according to the second to fourth embodiments and the thin client automatic transaction system 620 according to the fifth embodiment may each have a configuration and functions which pertain to the first embodiment, for example. Moreover, the automatic transaction systems 110, 310, 410 and 510 according to the first to fourth embodiments and the thin client automatic transaction system 620 according to the fifth embodiment may mutually each have a configuration and functions which pertain to another embodiment within a scope that does not produce any technological contradictions.

Furthermore, in the aforementioned second embodiment, a case was described where the communication monitoring unit 301, real processing flow list holding unit 302, legitimate processing flow list holding unit 303 and operation approval signature issuing unit 304 are provided in the card reader 314, but the present invention is not limited to or by such a configuration, rather, the communication monitoring unit 301, real processing flow list holding unit 302, legitimate processing flow list holding unit 303 and operation approval signature issuing unit 304 may be provided in any of the paper currency processing unit 313, encrypting pin pad 315, and receipt printer 316 outside the card reader 314 and the same processing as the card reader 314 may be executed in the paper currency processing unit 313, encrypting pin pad 315 or receipt printer 316.

Note that when the communication monitoring unit 301, real processing flow list holding unit 302, legitimate processing flow list holding unit 303 and operation approval signature issuing unit 304 are provided in the receipt printer 316, legitimate print information such as the format of the statement to be printed and the number of printed characters per unit time interval and the like is saved in the legitimate processing flow list holding unit 303, and the receipt printer 316 may determine independently whether the print request from the ATM control unit 10 is legitimate and accept the print request from the ATM control unit 10 and perform the print processing only when the print request is legitimate.

Moreover, when the communication monitoring unit 301, real processing flow holding unit 304, legitimate processing flow list holding unit 305, and operation approval signature issuing unit 303 are configured in the paper currency processing unit 313, a payout limit count per unit time interval is saved in the legitimate processing flow list holding unit 303, and the paper currency processing unit 313 may determine independently whether the payout request from the ATM control unit 10 is legitimate, and accept the payout request from the ATM control unit 10 and perform the payout transaction processing only when the payout request is legitimate.

Moreover, although cases where the card readers 412 and 512 are configured as per FIG. 13 were described in the foregoing third and fourth embodiments, the present invention is not limited to or by such cases, rather, a variety of other configurations can be widely applied.

Moreover, although cases where the card lock mechanism 428 is configured as per FIG. 14 were described in the foregoing third and fourth embodiments, the present invention is not limited to or by such cases, rather, a variety of other configurations can be widely applied.

Note that although the present invention was applied to the thin client automatic transaction system 620 in the foregoing fifth embodiment, the present invention is not limited to or by such an application, rather, the present invention can also be applied to a normal automatic transaction system without a thin client configuration.

INDUSTRIAL APPLICABILITY

The present invention can be applied to an ATM which performs payout transactions based on information recorded on a credit card or cash card or the like and based on user operations.

REFERENCE SIGNS LIST

3: accounting host computer
10: ATM control unit
21: IC card
110, 310, 410, 510: automatic transaction system
111, 311, 411, 511: ATM
112: security control unit
113, 313: paper currency processing unit
114, 314, 412, 512, 621A, 621-1A to 621-nA: card reader
115, 315: encrypting pin pad
116, 316: receipt printer 201, 301, 421: communication monitoring unit
202, 302: real processing flow list holding unit
203, 303: legitimate processing flow list holding unit
204, 304: operation approval signature issuing unit
205, 305: real processing flow list
206, 306: legitimate paper currency payout processing flow list
207, 307: legitimate card return processing flow list
208, 308: legitimate statement print processing flow list
209, 309: legitimate card data write processing flow
321, 422: card reader control unit
322: card reader transfer/reading unit
423: list holding unit
424: command execution authorization holding unit
425: authentication unit
428: card lock mechanism
430: command authorization association list
513: security token
514: one-time password
620: thin client automatic transaction system
621, 621-1 to 621-n: thin client ATM
618: card
622: thin client server
623: business store
650: card information database

The invention claimed is:

1. An automatic transaction apparatus which performs a payout transaction according to a request from a user, comprising:
  a plurality of modules which each execute processing required for the payout transaction;
  an overall controller configured to control each of the modules; and
  a security controller,
  wherein the security controller is configured to hold in advance a first list in which content of signals which are exchanged between the overall controller and each of the modules at the time of a normal payout transaction being recorded in the order in which the signals are exchanged, to sequentially record the content of the signals which are exchanged between the overall controller and each of the modules at the time of the actual payout transaction in a second list in the order in which the signals are exchanged, and to issue a signature approving operation of the modules when there is a match between the content of the first list and the content of the second list, and
  wherein the modules execute a corresponding operation when the security controller has issued the signature,
  the modules further comprising:
    a card reader configured to read information that is recorded on a card of the user that is presented by the user, the card reader comprising:
    a card lock mechanism configured to lock the card inserted by the user inside the apparatus;
    a card reader controller configured to control the card lock mechanism;
    a list holder configured to hold a third list that associates each of the commands supplied to the card reader from the overall controller with respective command execution authorizations for executing the commands;
    a command execution authorization holder configured to hold the command execution authorizations assigned to its own apparatus; and
    an authentication unit configured to execute predetermined authentication processing, wherein, in the third list, the command execution authorization for executing a card lock cancellation command, which is the command for canceling the lock when the card has been locked by the card lock mechanism, is associated with a second command execution authorization, which is the command execution authorization for executing a command of a higher security than the first command execution authorization, which is the command execution authorization normally assigned to the apparatus,
    wherein the authentication unit is configured to execute the authentication processing according to a request from a high-level host or according to an external operation,
    wherein the card reader controller is configured to update the command execution authorization held in the command execution authorization holder from the first command execution authorization to the second command execution authorization when the authentication processing by the authentication unit has been performed normally, wherein, when the card lock cancellation command has been supplied from the overall controller, the card reader controller is configured to confirm the command execution authorization held by the command execution authorization holder and the command execution authorization for executing the card lock cancellation command registered in the third list, and
    wherein the card reader controller is configured to cancel the lock on the card by causing the card lock mechanism to operate when the command execution authorization assigned to its own apparatus is the second command execution authorization.

2. The automatic transaction apparatus according to claim 1, further comprising, as the modules:
  a paper currency processor configured to withdraw and pay out paper currency that is stored in a receiving chamber in the apparatus;
  a pin pad which comprises a ten key pad and enables the user to input required information relating to the payout transaction; and
  a printer configured to print the required information.

3. The automatic transaction apparatus according to claim 1, further comprising, as the modules:
  a paper currency processor configured to withdraw and pay out paper currency that is stored in a receiving chamber in the apparatus,
  wherein the security controller is the card reader or the paper currency processor.

4. The automatic transaction apparatus according to claim 1,
  wherein the security controller stores content of the second list thus far as unauthorized processing when there is no match between content of the first list and content of the second list.

5. The automatic transaction apparatus according to claim 1,
  wherein the external operation is an operation to input a one-time password generated by a token.

6. The automatic transaction apparatus according to claim 1,
  wherein, after executing the card lock cancellation command, the card reader controller is configured to determine whether a condition for restoring the command execution authorization held by the command execution authorization holder from the second command execution authorization to the first command execution authorization has been satisfied, and wherein, when the condition has been satisfied, the card reader controller is configured to restore the command execution authorization held by the command execution authorization holder from the second command execution authorization to the first command execution authorization.

7. The automatic transaction apparatus according to claim 6, wherein the condition for restoring the command execution authorization held by the command execution authorization holder from the second command execution authorization to the first command execution authorization is that a command requesting the second command execution authorization has been executed a fixed number of times.

8. An automatic transaction apparatus which performs a payout transaction according to a request from a user, comprising:

a plurality of modules which each execute processing required for the payout transaction;

an overall controller configured to control each of the modules; and a security controller, wherein the security controller is configured to hold in advance a first list in which content of signals which are exchanged between the overall controller and each of the modules at the time of a normal payout transaction being recorded in the order in which the signals are exchanged, to sequentially record the content of the signals which are exchanged between the overall controller and each of the modules at the time of the actual payout transaction in a second list in the order in which the signals are exchanged, and to issue a signature approving operation of the modules when there is a match between the content of the first list and the content of the second list, and wherein the modules execute a corresponding operation when the security controller has issued the signature, the modules further comprising:

a card reader configured to read information that is recorded on a card of the user that is presented by the user, wherein the card reader stores, as card information, a card number of each of the cards that have performed a payout transaction and a payment limit amount which is a payout limit amount configured for the cards and a paid amount which is the amount of money paid, and wherein the card reader is configured to determine the feasibility of a payout transaction based on the stored card information of each of the cards and to share the stored card information of each of the cards with the card reader of another automatic transaction apparatus, wherein the automatic transaction apparatus is a thin client automatic transaction apparatus in a thin client automatic transaction system in which the automatic transaction apparatus is configured to execute a required minimum amount of processing and a thin client server coupled to the automatic transaction apparatus is configured to execute other processing, wherein the card reader is configured to determine the feasibility of the payout transaction according to whether a paid amount for the card of the user exceeds the payment limit amount when a transaction amount requested by the user has been paid, based on the stored card information of each of the cards, and wherein, when a payout transaction is executed, the card reader is configured to share the card information of each of the cards with the card reader of the other automatic transaction apparatus by sending the card information of the card of the user to another thin client automatic transaction apparatus which is the other automatic transaction apparatus via the thin client server.

9. The automatic transaction apparatus according to claim 8, wherein the card reader is configured to encrypt the card information and to send the encrypted card information to the thin client server.

10. A control method of an automatic transaction apparatus which performs a payout transaction according to a request from a user, the automatic transaction apparatus having:

a plurality of modules which each execute processing required for the payout transaction, the plurality of modules including a card reader;

an overall controller configured to control each of the modules; and a security controller, wherein the automatic transaction apparatus is a thin client automatic transaction apparatus in a thin client automatic transaction system in which the automatic transaction apparatus is configured to execute a required minimum amount of processing and a thin client server coupled to the automatic transaction apparatus is configured to execute other processing, the control method comprising:

the security controller unit holding in advance a first list in which content of signals which are exchanged between the overall controller and each of the modules at the time of a normal payout transaction is recorded in the order in which the signals are exchanged;

the security controller sequentially recording the content of the signals which are exchanged between the overall controller and each of the modules at the time of the actual payout transaction in a second list in the order in which the signals are exchanged;

the security controller issuing a signature approving operation of the modules when there is a match between the content of the first list and the content of the second list;

the modules executing a corresponding operation when the security controller has issued the signature;

the card reader reading information that is recorded on a card of the user that is presented by the user, wherein the card reader stores, as card information, a card number of each of the cards that have performed a payout transaction and a payment limit amount which is a payout limit amount configured for the cards and a paid amount which is the amount of money paid;

the card reader determining the feasibility of a payout transaction based on the stored card information of each of the cards and sharing the stored card information of each of the cards with the card reader of another automatic transaction apparatus;

the card reader determining the feasibility of the payout transaction according to whether a paid amount for the card of the user exceeds the payment limit amount when a transaction amount requested by the user has been paid, based on the stored card information of each of the cards; and when a payout transaction is executed, the card reader sharing the card information of each of the cards with the card reader of the other automatic transaction apparatus by sending the card information of the card of the user to another thin client automatic transaction apparatus which is the other automatic transaction apparatus via the thin client server.

* * * * *